United States Patent
Stojanovic et al.

(10) Patent No.: US 8,646,840 B2
(45) Date of Patent: Feb. 11, 2014

(54) VEHICLE SEAT ASSEMBLY

(75) Inventors: Slavko Stojanovic, Plymouth, MI (US); Aaron Pfau, Highland, MI (US); Randy Dale, Franklin, TN (US); Richard Miller, Brentwood, TN (US); Masashi Okumura, Chennai (IN); Hiroki Matsui, Isehara (JP); Chiyoko Murata, Ebina (JP); Takenori Kiyose, Atsugi (JP); Kimihiro Yano, Atsugi (JP)

(73) Assignee: Nissan North America, Inc., Franklin, TN (US)

( * ) Notice: Subject to any disclaimer, the term of this patent is extended or adjusted under 35 U.S.C. 154(b) by 472 days.

(21) Appl. No.: 12/976,713

(22) Filed: Dec. 22, 2010

(65) Prior Publication Data

US 2012/0161486 A1    Jun. 28, 2012

(51) Int. Cl.
*B60N 2/00*    (2006.01)
*B60N 2/02*    (2006.01)

(52) U.S. Cl.
USPC ...... 297/331; 297/344.1; 297/325; 296/65.09

(58) Field of Classification Search
USPC ............ 297/316, 317, 325, 331, 344.1, 335, 297/378.12; 296/65.05, 65.09, 65.08
See application file for complete search history.

(56) References Cited

U.S. PATENT DOCUMENTS

| | | | |
|---|---|---|---|
| 4,884,843 A | 12/1989 | DeRees | |
| 4,925,228 A | 5/1990 | Pipon et al. | |
| 5,951,104 A | 9/1999 | Tsuchiya et al. | |
| 6,220,665 B1 | 4/2001 | Dingel et al. | |
| 6,676,216 B1 | 1/2004 | Freijy et al. | |
| 6,761,407 B1* | 7/2004 | Goodbred | 297/344.1 |
| 7,023,108 B2 | 4/2006 | Itami et al. | |
| 7,121,624 B2* | 10/2006 | Pejathaya et al. | 297/378.12 |
| 7,252,318 B2 | 8/2007 | Sumida et al. | |
| 7,300,107 B2 | 11/2007 | Kämmerer | |
| 7,328,929 B2 | 2/2008 | Epaud | |
| 7,578,537 B2* | 8/2009 | Baetz et al. | 296/65.09 |
| 2010/0026032 A1 | 2/2010 | Leopold | |
| 2010/0289313 A1 | 11/2010 | Moegling et al. | |

FOREIGN PATENT DOCUMENTS

| | | | |
|---|---|---|---|
| DE | 10354272 A1 | 6/2005 | |
| JP | 63-219432 A | 9/1988 | |
| JP | 6-23465 Y2 | 6/1994 | |
| JP | 2002-193003 A | 7/2002 | |
| JP | 2007-186196 A | 7/2007 | |

OTHER PUBLICATIONS

2010 Dodge Journey Owner's Manual.

* cited by examiner

*Primary Examiner* — Milton Nelson, Jr.
(74) *Attorney, Agent, or Firm* — Global IP Counselors

(57) ABSTRACT

A vehicle seat assembly includes a base portion, a support bracket, a seatback frame and a cushion frame. The support bracket is pivotally coupled to the base portion about a first axis. The seatback frame is pivotally coupled to the support bracket about a second axis that is spaced apart from the first axis. The cushion frame is pivotally coupled to the support bracket about a third axis that is spaced apart from both the first and second axes, such that the seatback frame and the cushion frame move with the support bracket relative to the base portion when the support bracket pivots about the first axis.

20 Claims, 30 Drawing Sheets

VEHICLE SEAT ASSEMBLY

BACKGROUND

1. Field of the Invention

The present invention generally relates to a vehicle seat assembly. More particularly, the present invention relates to a vehicle seat assembly for a seat row that allows for increased access to another seat row positioned further rearward in the vehicle than the seat row.

2. Background Information

Vehicles such as vans, sport utility vehicles (SUVs) and so on often have more than two rows of seats. However, such vehicles having more than two rows of seats typically create challenges for vehicle designers. For example, many vans and SUVs have three rows of seats, namely, a front or first row, a rear or second row, and a third or back row behind the rear row. Therefore, unless the vehicle includes a large sliding side door, access to the third row of seats will typically require adjustment or repositioning of one or more of the rear row seats.

Conventionally, to provide access to the third row of seats, the rear row of seats can include cushions that tilt upward, seatbacks that fold down, and/or seats that are capable of sliding forward. Except for the forward sliding features, all of these features require that at least one second row seat is unobstructed in order for the third row of seats to be accessed. Naturally, this presents little difficulty and inconvenience when a seat in the rear row is empty or an occupant of the seat can quickly and easily move so that the position of that seat can be adjusted to access the third row seats. However, this becomes much more problematic when a rear row seat is obstructed by a rigid obstacle such as an installed child seat or another object. Therefore, even if a rear row seat can slide forward somewhat while obstructed, this limited forward movement may only marginally increase the ease of access to the third row of seats. Also, these types of seats typically include an under-seat lever or "towel bar" that is manually actuated to enable the seat to be slid forward. However, this manual actuation may become inconvenient or impossible when the seat is obstructed.

SUMMARY

In view of the state of the known technology, one aspect of the present invention is directed to various features of a vehicle seat assembly including a base portion, a support bracket, a seatback frame and a cushion frame. The support bracket is pivotally coupled to the base portion about a first axis. The seatback frame is pivotally coupled to the support bracket about a second axis that is spaced apart from the first axis. The cushion frame is pivotally coupled to the support bracket about a third axis that is spaced apart from both the first and second axes, such that the seatback frame and the cushion frame move with the support bracket relative to the base portion when the support bracket pivots about the first axis.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
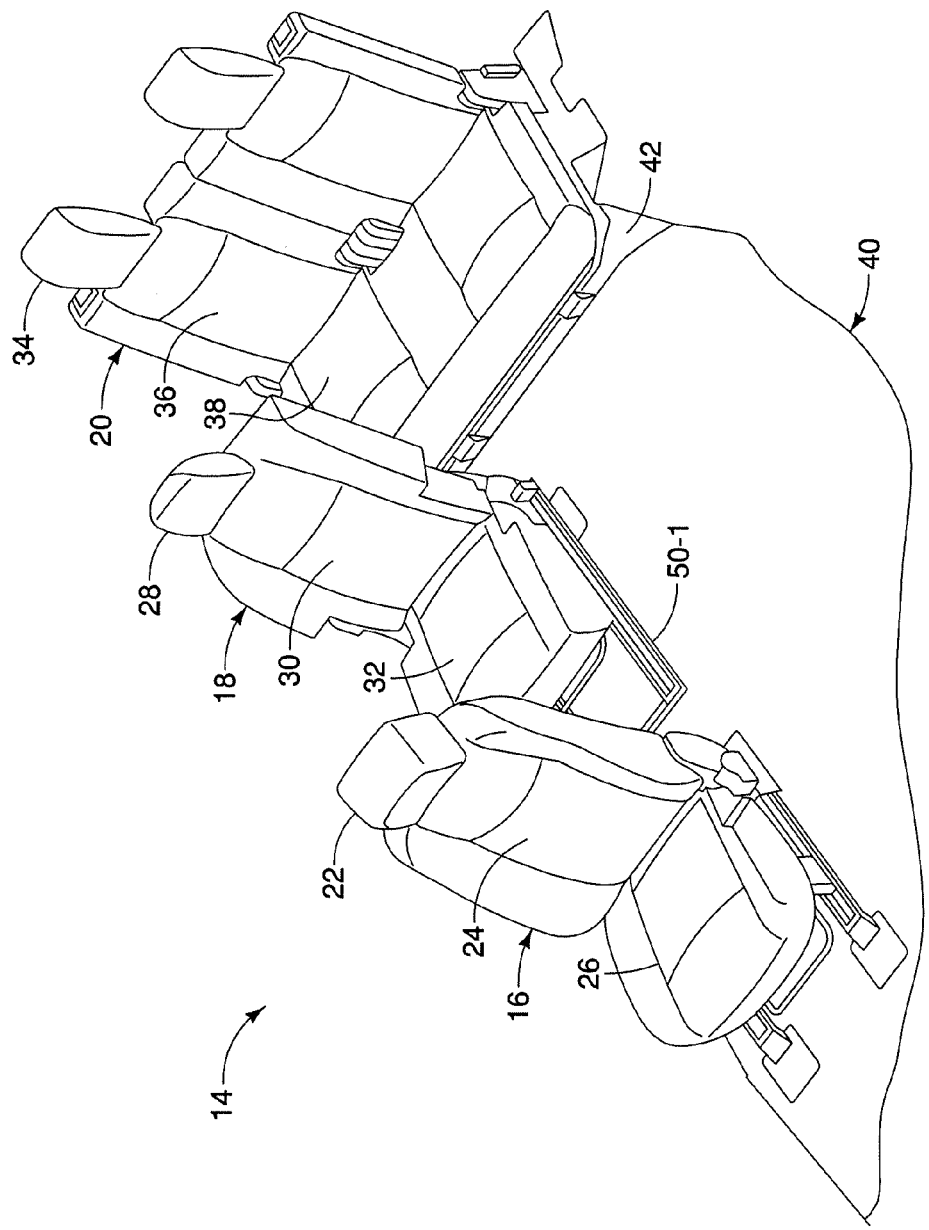
FIG. 1 is a perspective view of a vehicle seating arrangement including three rows of seats employing the disclosed embodiments.
Figure 2:
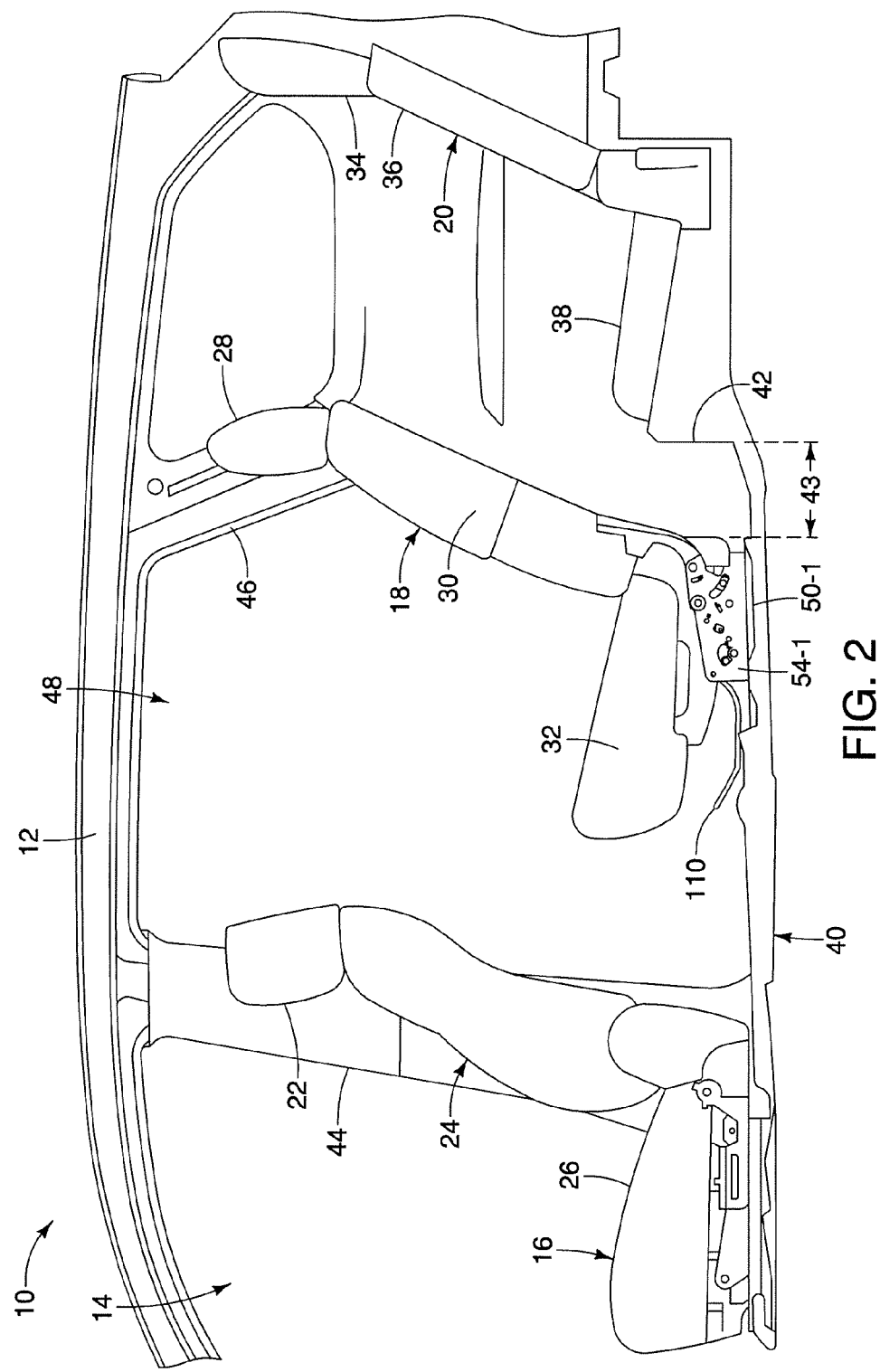
FIG. 2 is a side view of the vehicle seating arrangement showing a position of a rear seat relative to a front seat and a third row seat while the rear seat is in an in-use position.
Figure 3:
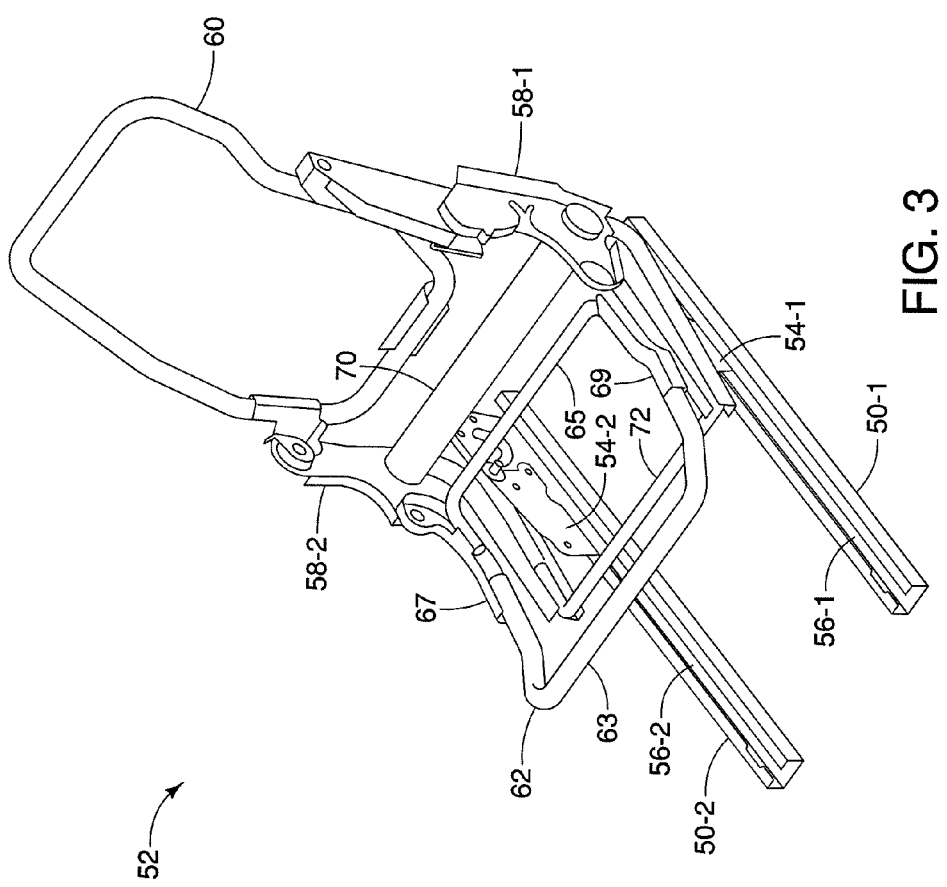
FIG. 3 is a perspective view of an example of a seat frame within the rear seat including side-mounted support brackets that pivot with respect to slide carriages, and a seatback frame component and cushion frame component that each pivot relative to the side-mounted support brackets.
Figure 4:
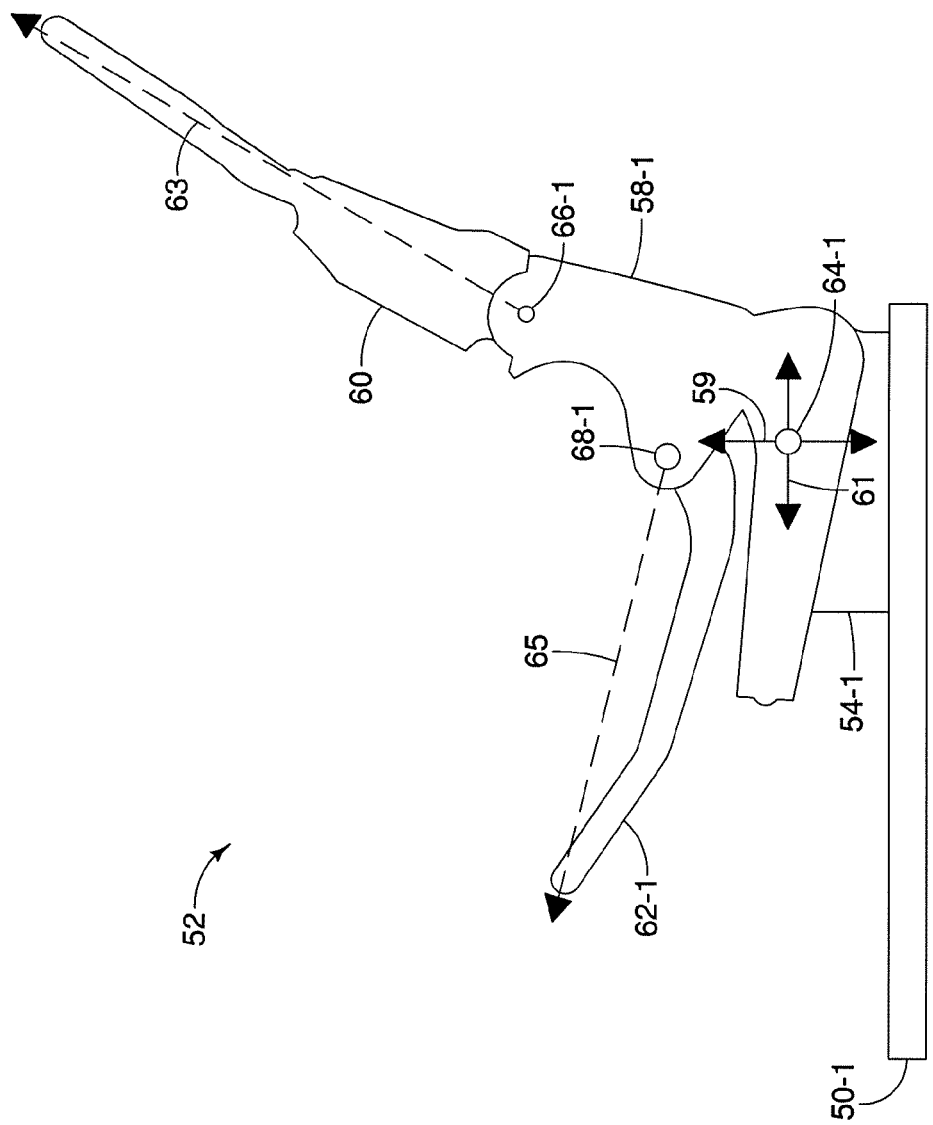
FIG. 4 is a simplified side view of the seat frame shown in FIG. 3 taken from the driver's side of the vehicle, illustrating an example of axes for pivoting movement of the cushion frame component and the seatback frame component relative to the support brackets, and an example of a pivot axis for the support brackets relative to the slide carriages.
Figure 5:
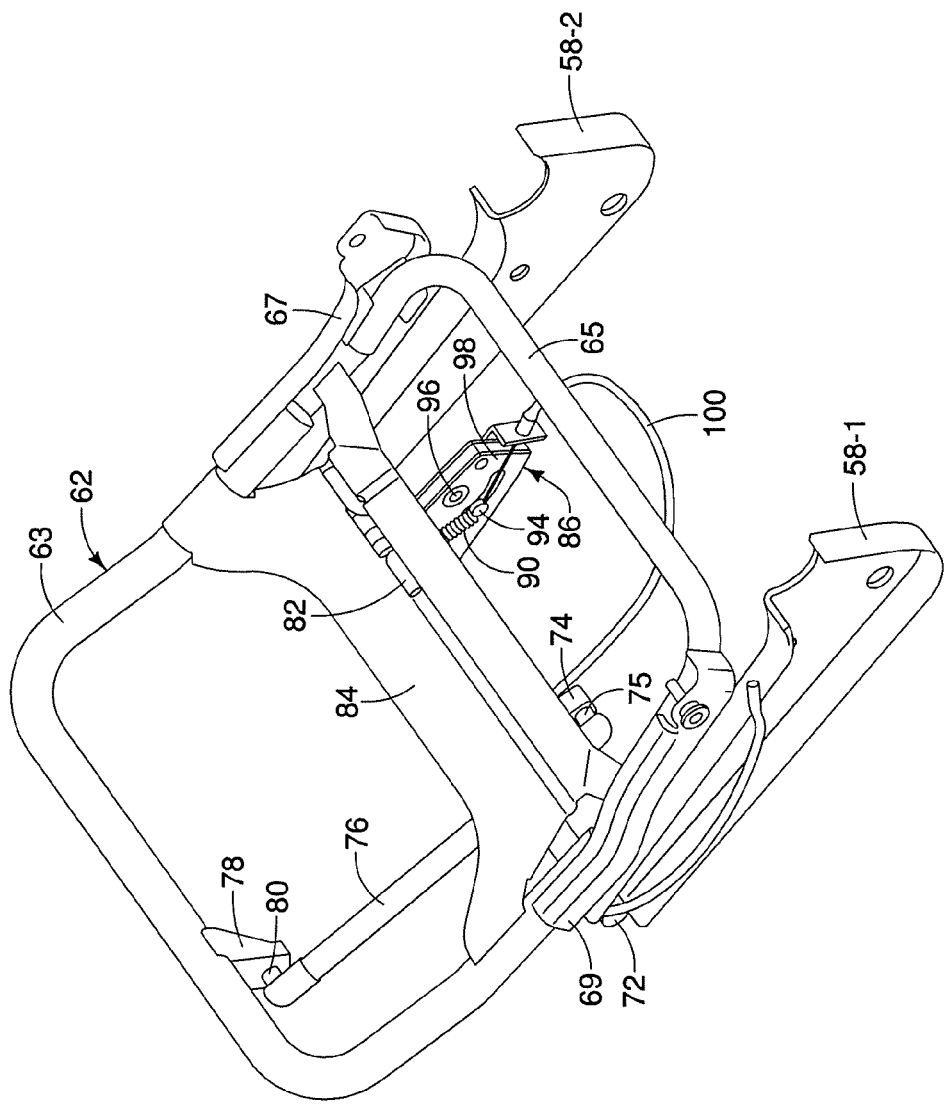
FIG. 5 is a simplified rear perspective view of the seat frame shown in FIG. 3.
Figure 6:
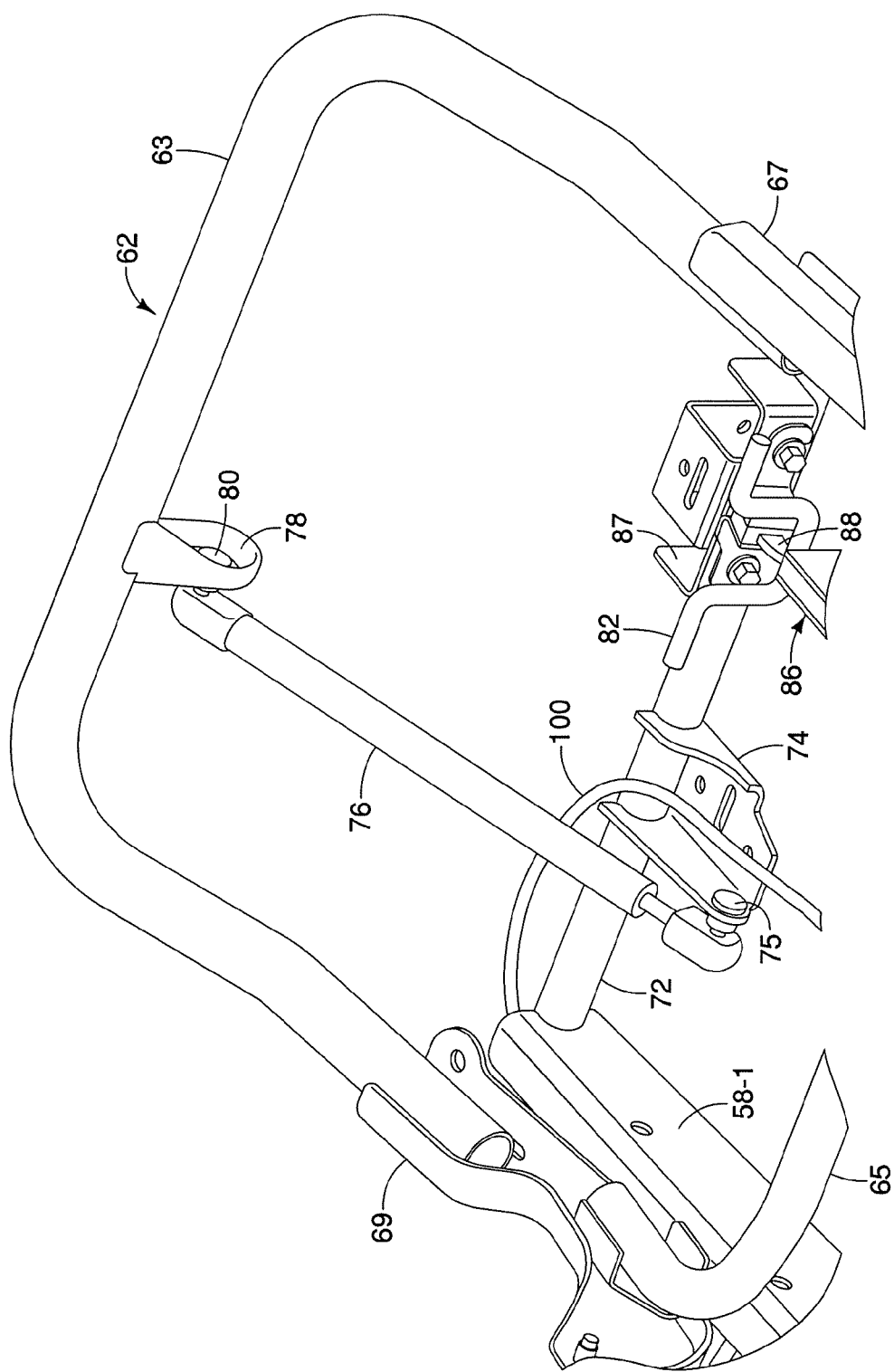
FIG. 6 is a detailed perspective view of the cushion frame component of the seat frame.
Figure 7:
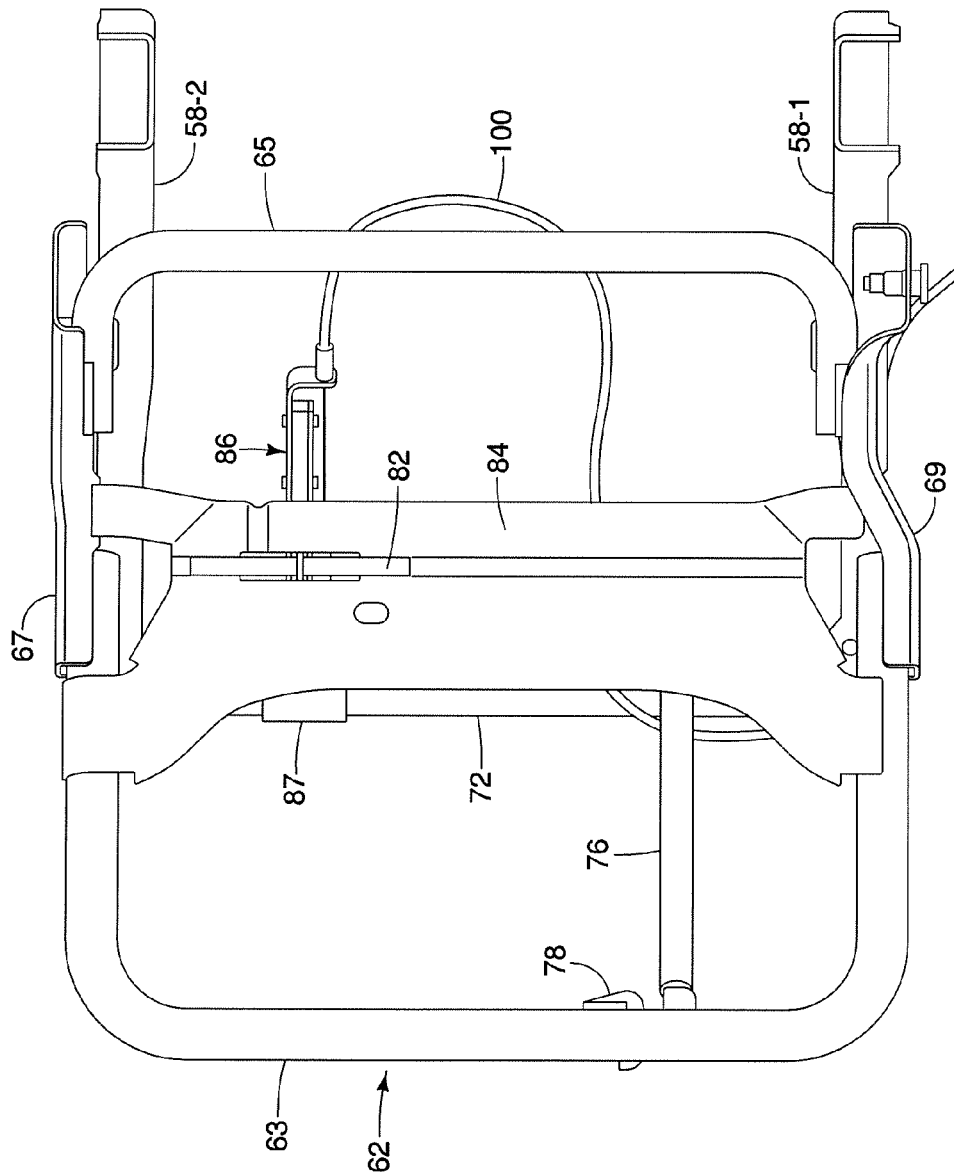
FIG. 7 is a top view of the seat frame component.
Figure 8:
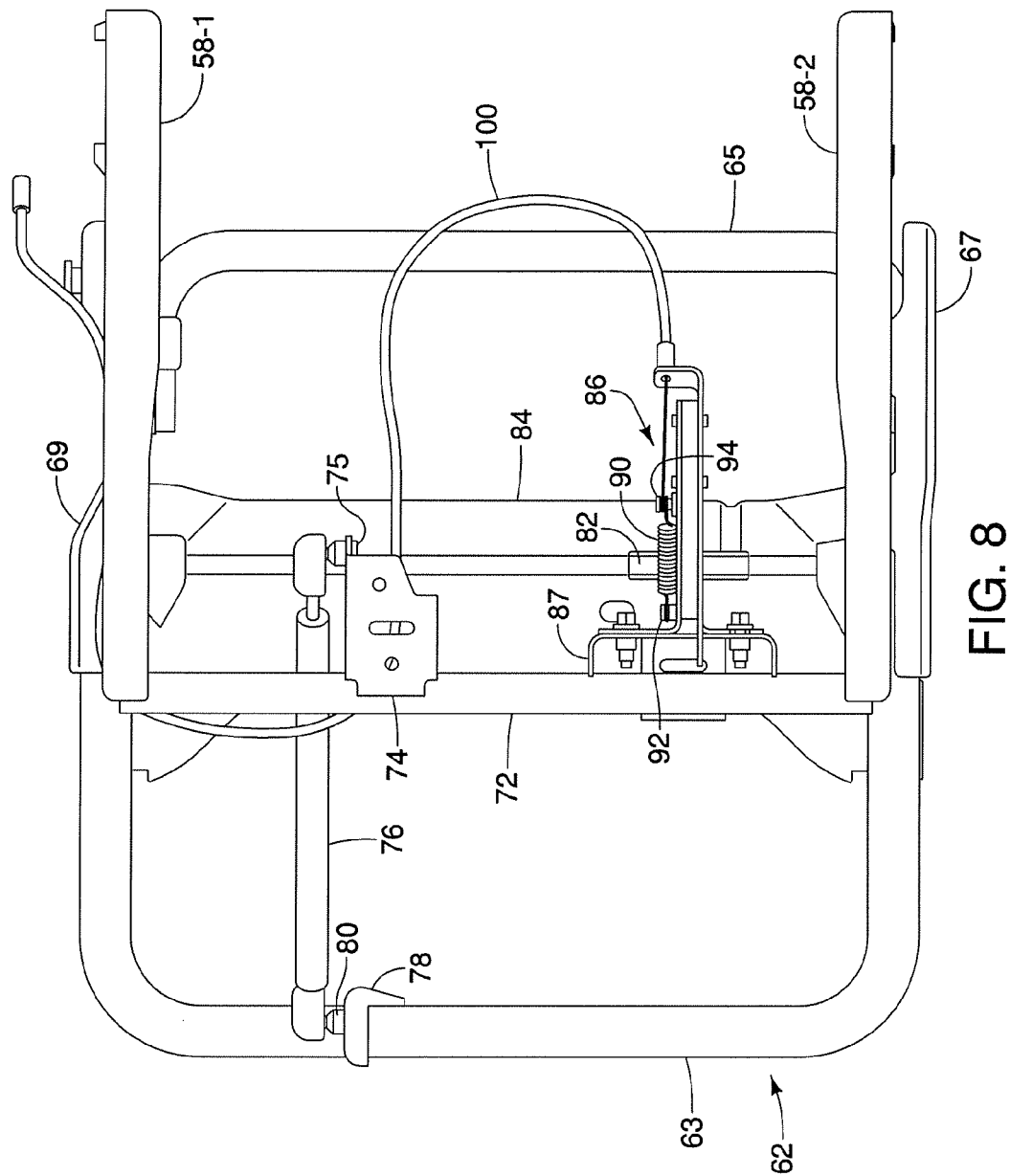
FIG. 8 is a bottom view of the seat frame component.
Figure 9:
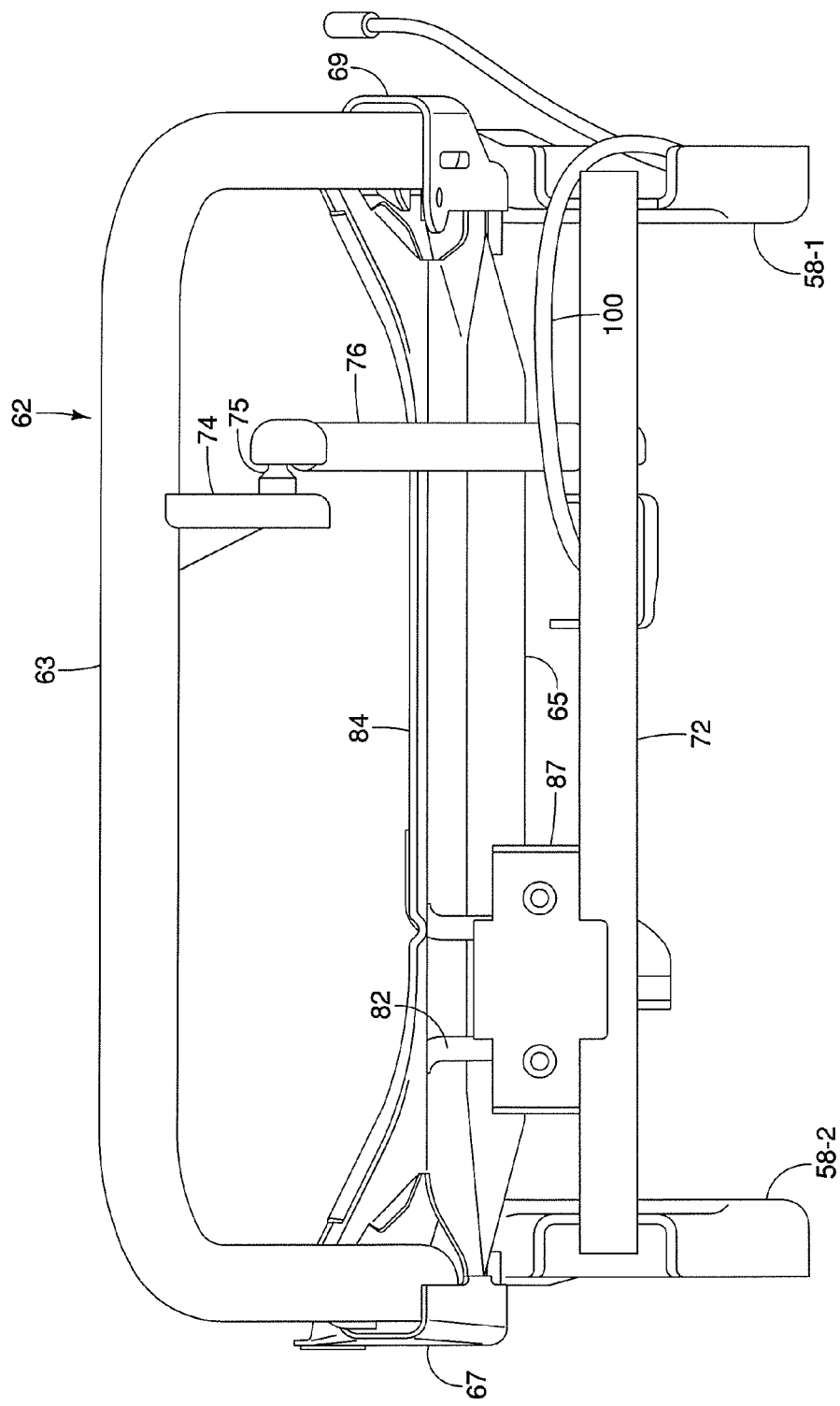
FIG. 9 is a front view of the seat frame component.
Figure 10:
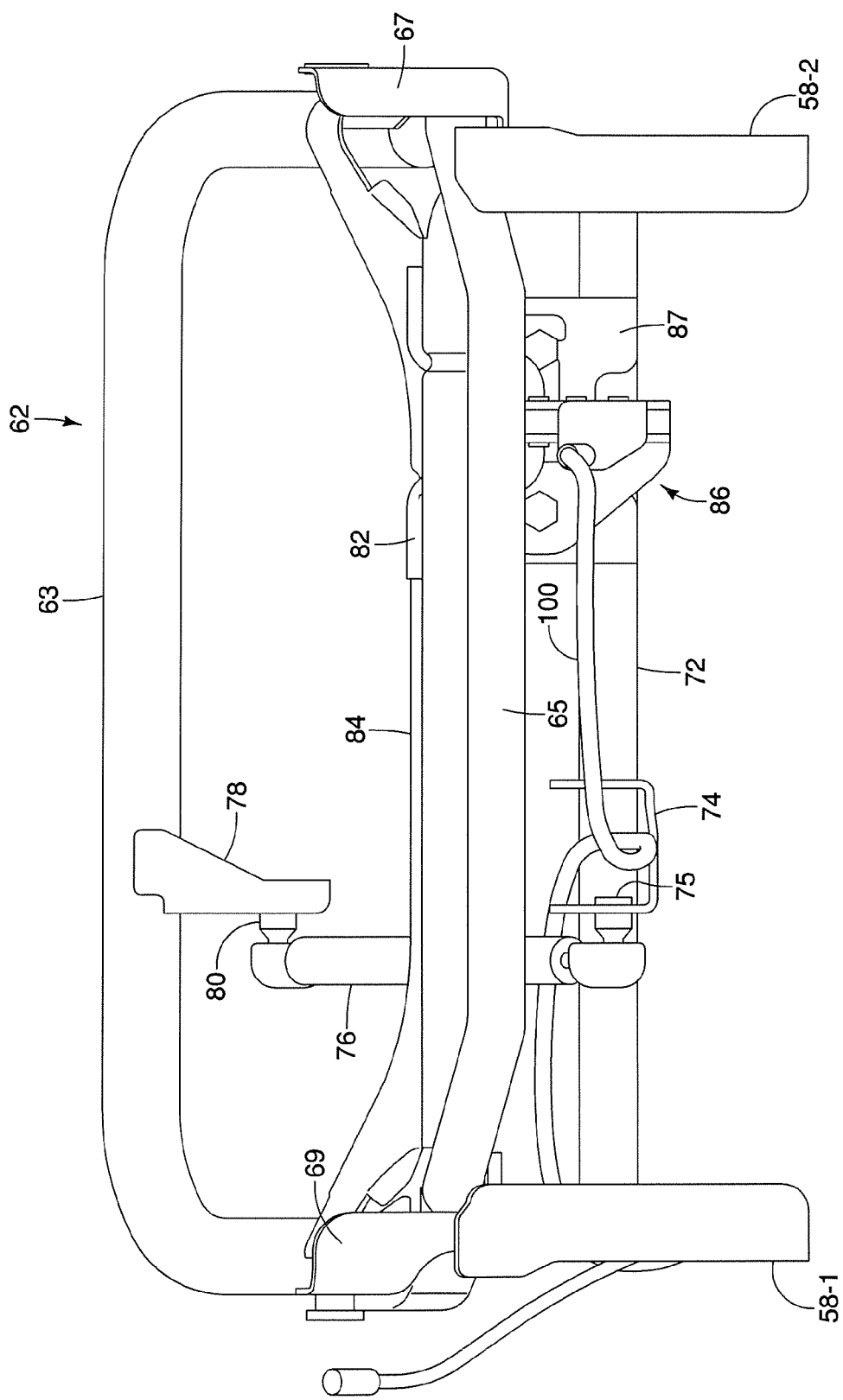
FIG. 10 is a rear view of the seat frame component.

FIGS. 1 and 2 illustrate an example of a vehicle 10, such as a van, SUV, or any other type of vehicle having a body structure 12 that defines a passenger compartment 14 with multiple seat rows. In this example, the passenger compartment 14 includes a front seat row having at least one front seat 16, a rear seat row having at least one rear seat 18, and a third or back seat row having at least one third row seat 20.

Each front seat 16 has a front headrest 22, a front seatback 24 and a front seat cushion 26. Also, each rear seat 18 has a rear headrest 28, a rear seatback 30 and a rear seat cushion 32. In addition, each back seat 20 has a back headrest 34, a back seatback 36 and a back seat cushion 38. The front seats 16, rear seats 18 and third row seats 20 are secured to the vehicle floor structure 40 in a manner discussed herein and as known in the art. Also, in this example, the vehicle floor structure 40 has a stepped surface 42 proximate to the third row seats 20. Accordingly, a space 43 is present between the front surface of the stepped surface 42 and rear surface of the rear seat 18 as indicated. In this example, the space 43 may be approximately 174 mm when the rear seat 18 is in an in-use position as shown. However, the space 43 can be any suitable distance as necessary or desired.

As further shown, the front seats 16, rear seats 18 and third row seats 20 are positioned in a suitable manner with respect to the vehicle B-pillar 44, the vehicle C-pillar 46 and the vehicle side door opening 48 that is located between the vehicle B-pillar 44 and the vehicle C-pillar 46. Naturally, the vehicle 10 can include any suitable number of seat rows. Furthermore, for a vehicle 10 having only two seat rows, a front seat 16 can be configured to include the features discussed herein pertaining to the rear seat 18.

As will now be discussed, at least one of the rear seats 18, which can also be referred to as a vehicle seat assembly, is configured to allow for increased access to the third row seats 20. As illustrated, the vehicle floor structure 40 includes a plurality of slide tracks (slide rails) 50-1 and 50-2 in this example. As indicated, the rear seat 18 is slidably secured to the vehicle floor structure 22 by a plurality of slide carriages (base portion) 54-1 and 54-2 in this example.

Specifically, as shown in more detail in FIGS. 3-7, the rear seat 18 has an inner frame 52. The inner frame 52 includes a plurality of slide carriages 54-1 and 54-2, which can be referred to as a base portion of the vehicle seat assembly 18. Each of the slide carriages 54-1 and 54-2 slidably engages with a respective groove 56-1 and 56-2 in one of the slide tracks 50-1 and 50-2, to enable the inner frame 52 to slide along the slide tracks 50-1 and 50-2. Hence, the base portion is configured to move along the slide tracks 50-1 and 50-2 parallel to a fore-to-aft direction of the vehicle 10 in order to collectively move the vehicle seat assembly 18 parallel to the fore-to-aft direction.

The inner frame 52 further includes a plurality of support brackets 58-1 and 58-2, a seatback frame component 60 and a cushion frame component 62. As indicated, each of the support brackets 58-1 and 58-2 is coupled to a respective one of the slide carriages 54-1 and 54-2 (the base portion) at a respective bracket axis 64-1 and 64-2, which can be referred to as a first axis. Hence, the base portion is mounted to the vehicle floor structure 40. Moreover, the base portion is mounted between a front seat 16 and a back seat 20 relative to a longitudinal direction of the vehicle 10. Accordingly, the base portion is configured to mount the vehicle seat assembly 18 adjacent to the door opening 48 in the vehicle 10. More particularly, the base portion is configured to mount the seat assembly 18 between a B-pillar 44 and a C-pillar 46 of the vehicle 10.

The seatback frame component 60 is pivotally coupled to each of the support brackets 58-1 and 58-2 at a seatback axis 66-1 and 66-2 on each of the support brackets 58-1 and 58-2, respectively. Accordingly, the seatback frame component 60 extends upward from the support brackets 58-1 and 58-2. Each seatback axis 66-1 and 66-2, which can also be referred to as a second axis, is spaced apart from a respective bracket axis 64-1 and 64-2 (first axis). Similarly, the cushion frame component 62 is pivotally coupled to each of the support brackets 58-1 and 58-2 at a respective cushion axis 68-1 and 68-2 on the support brackets 58-1 and 58-2. In this example, the cushion frame component 62 includes cushion frame bars 63 and 65 that are coupled to each other and to the support brackets 58-1 and 58-2 by cushion brackets 67 and 69. Each cushion axis 68-1 and 68-2, which can also be referred to as a third axis, is spaced apart from a respective bracket axis 64-1 and 64-2 (first axis) and a respective seatback axis (second axis) 66-1 and 66-2. In this example, the cushion frame component 62 extends laterally outward from the support brackets 58-1 and 58-2 at the third axes 68-1 and 68-2, which are situated below the seatback frame component 60.

In addition, a crossbar 70 couples the support brackets 58-1 and 58-2 together. Accordingly, the seatback frame component 60 and the cushion frame component 62 move with the support brackets 58-1 and 58-2 relative to the slide brackets 54-1 and 54-2 (base portion) when the support brackets 58-1 and 58-2 pivot about their respective bracket axes 64-1 and 64-2 (first axis). When the rear seat 18 is positioned in a normal in-use position, the support brackets 58-1 and 58-2 are oriented in the exemplary manner shown with respect to vertical vector direction 59 and horizontal vector direction 61. Also, the rear seatback 30 extends in a rear seatback vector direction 63, and the rear seat cushion 32 extends in a rear cushion vector direction 65.

As can be appreciated by those skilled in the relevant art, the slide tracks 50-1 and 50-2 can be coupled to the vehicle floor 40 by nuts, bolts, rivets, welds or any other suitable connectors. Also, the components of the inner frame 52 such as the slide carriages 54-1 and 54-2, support brackets 58-1 and 58-2, seatback frame component 60, cushion frame component 62, and crossbar 70 can be coupled together by nuts, bolts, rivets or any other suitable connectors. Furthermore, the slide tracks 50-1 and 50-2, and other components of the inner frame 52, such as the slide carriages 54-1 and 54-2, support brackets 58-1 and 58-2, seatback frame component 60, cushion frame component 62 and crossbar 70 can be made of metal, such as steel or aluminum, or any material having sufficient strength and durability. In essence, any of the components of the inner frame 52 discussed herein can be made of metal, such as steel or aluminum, or any material having sufficient strength and durability.

Figure 11:
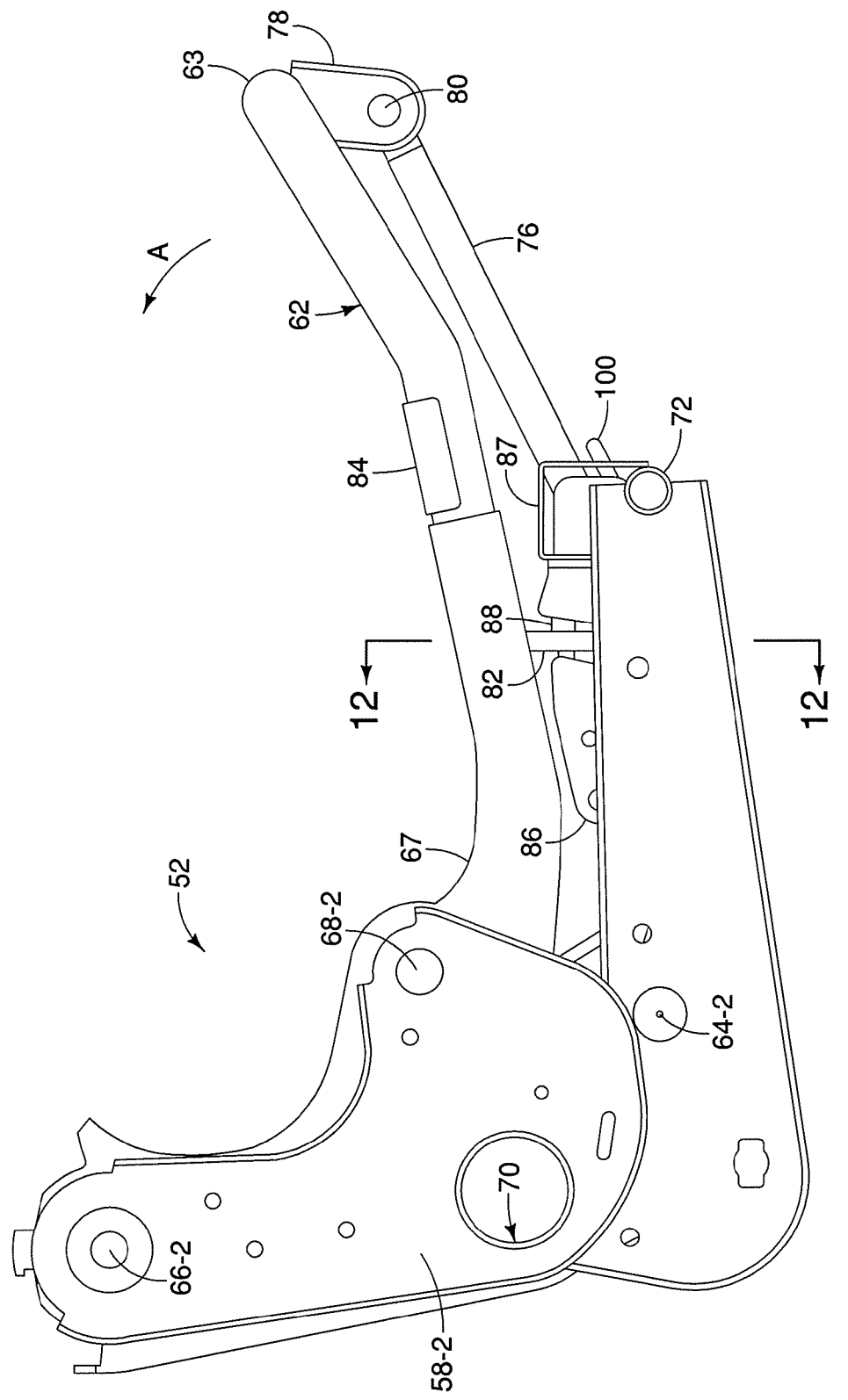
FIG. 11 is a simplified side profile view of the seat frame shown in FIG. 3 taken from the passenger side of the vehicle.
Figure 12:
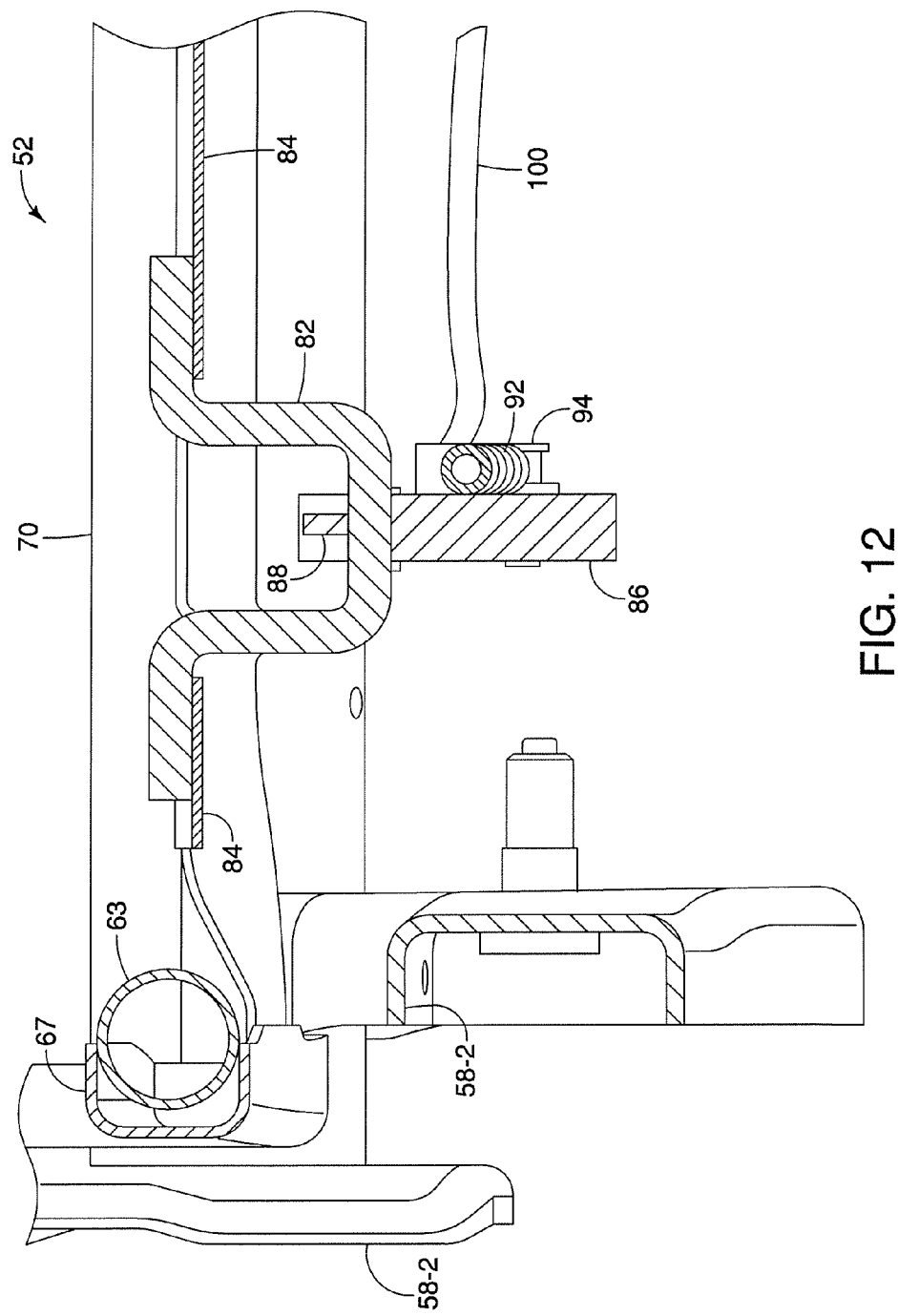
FIG. 12 is a cross-sectional view taken along lines 12-12 in FIG. 11.
Figure 13:
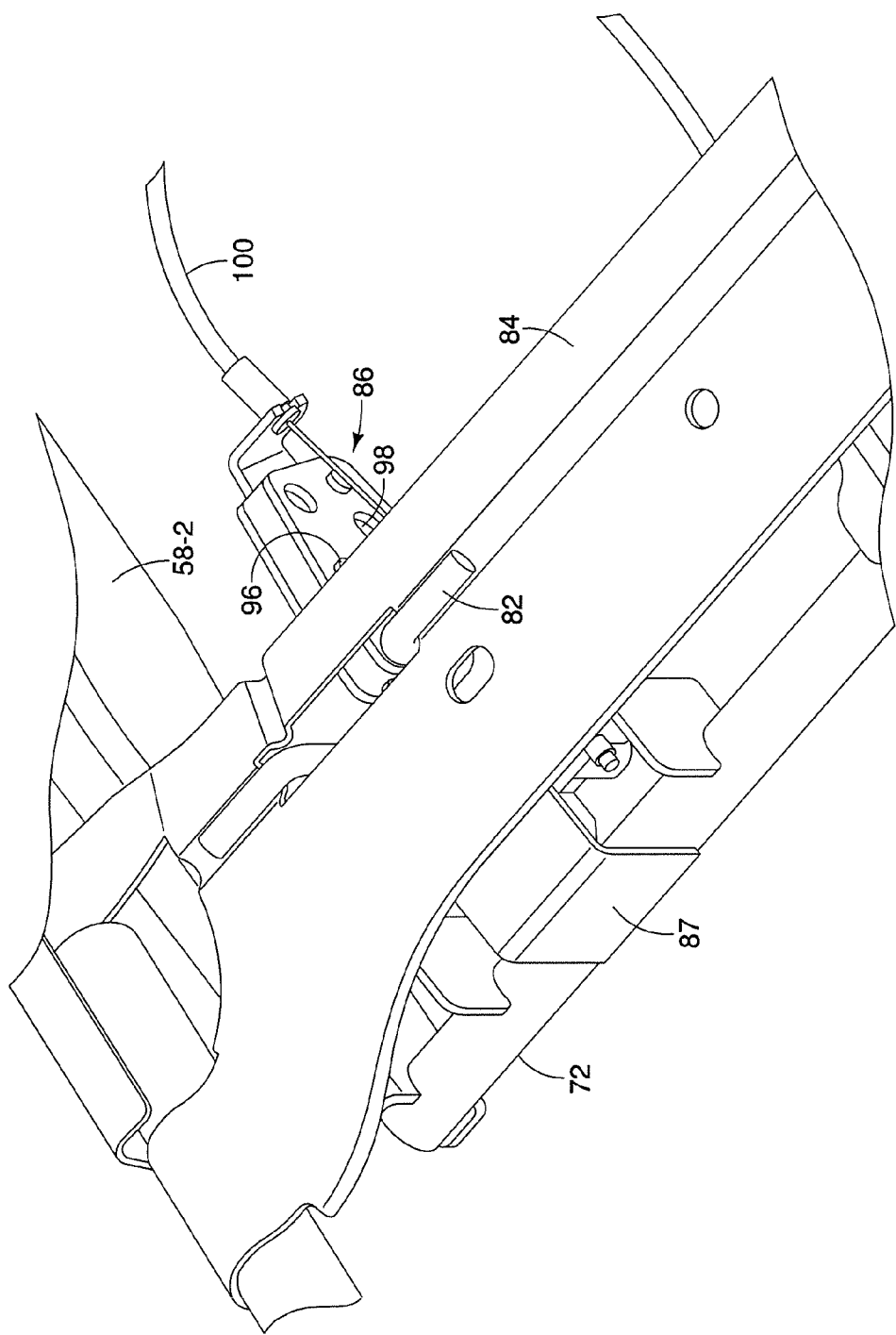
FIG. 13 is a detailed front perspective view of the seat frame including an example of a cushion latch area.
Figure 14:
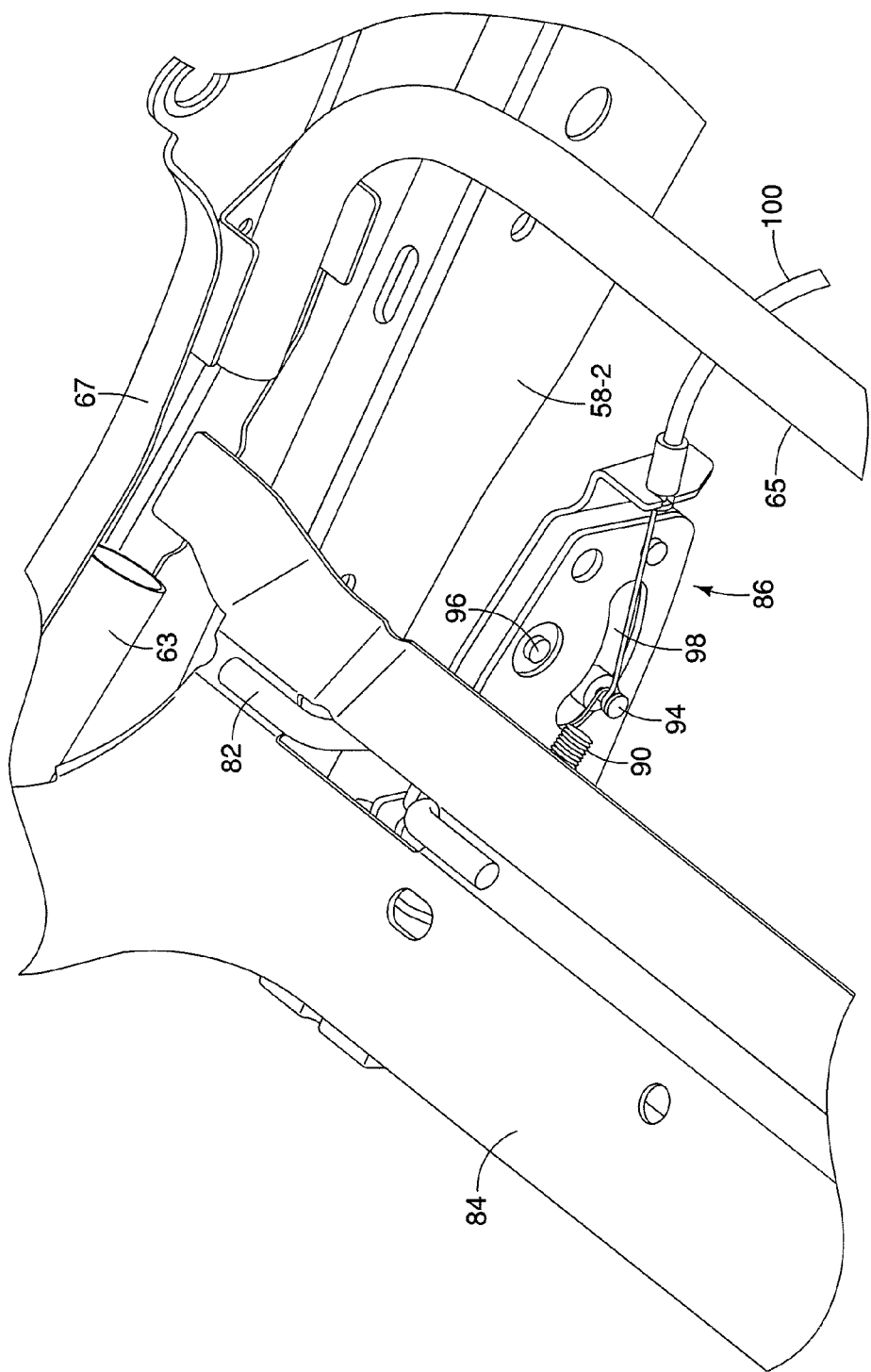
FIG. 14 is a detailed rear perspective view of the cushion latch area shown in FIG. 13.

Further details of components of the inner frame 52 are shown in FIGS. 5-24. As indicated, the inner frame 52 further includes a front bar 72 that couples the front ends of the support brackets 58-1 and 58-2 to each other. A bracket 74 is coupled to the front bar 72. A biasing member 76, such as a gas strut, is pivotally coupled to the bracket 74 at a pivot axis 75. Thus, one end of biasing member 76 is pivotally coupled to the front bar 72 via bracket 74. The other end of biasing member 76 is pivotally coupled to a strut bracket 78 at a strut axis 80. The strut bracket 78 is coupled to the free end of the frame bar 63 of the cushion frame component 62. Accordingly, the biasing member 76 biases the cushion frame component 62 to pivot about cushion axes 68 in a direction indicated by arrow A to a lifted position as shown in FIG. 11 and discussed in more detail below.

As further illustrated, a cushion striker 82 is attached to a striker bracket 84 that is attached to the cushion frame component 62. That is, in this example, the striker bracket 84 is connected to the cushion frame bar 63 and to brackets 67 and 69. A cushion latch 86 having a catch 88 is positioned to engage the cushion striker 82 when the rear seat cushion 32 is in the use position as shown. In this example, the cushion latch 86 is connected to a bracket 87 that is connected to the front bar 72. A latch spring 90 is connected between a fixed post 92 and another post 94 that is coupled to the catch 88 and moveable along a slot 98 in the cushion latch 86 about a pivot point 96. Accordingly, the latch spring 90 biases the cushion latch 86 into a closed position in which the catch 88 engages the cushion striker 82. Accordingly, the engagement of the catch 88 with the cushion latch 86 retains the cushion frame component 62 against the force of biasing member 76, and thus prevents the biasing member 76 from pivoting the cushion frame component 62 about the cushion axes 68.

Figure 26:
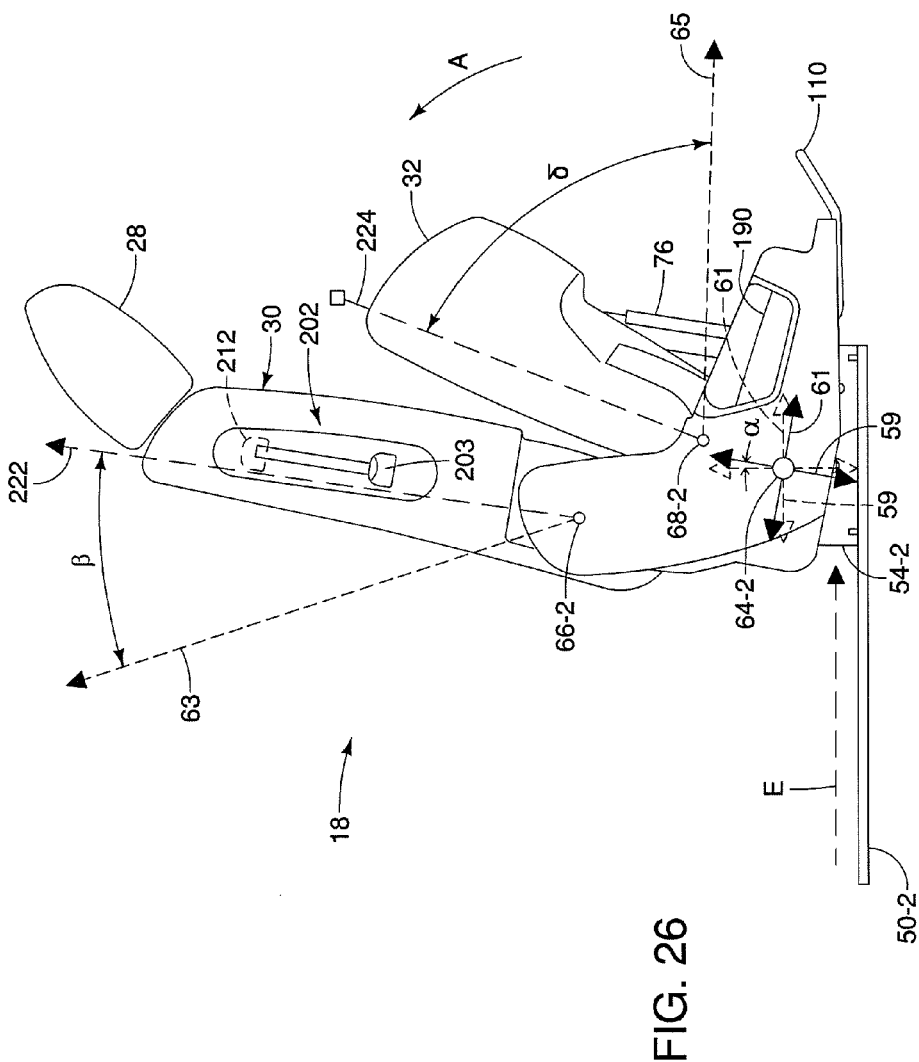
FIG. 26 is a side elevational view of the rear seat in an enhanced access position after the seat adjustment actuator is operated.

As further shown, one end of a release cable 100 is attached to the post 94 of the cushion latch 86 to pull the post 94 along slot 98 and thus release the catch 88 from the cushion striker 82 to open the cushion latch 86. When the catch 88 is released from the cushion striker 82, the biasing member 76 urges the cushion frame component 62 to pivot about cushion axes 68 in a direction A as shown in FIG. 26 and discussed in more detail below.

Figure 15:
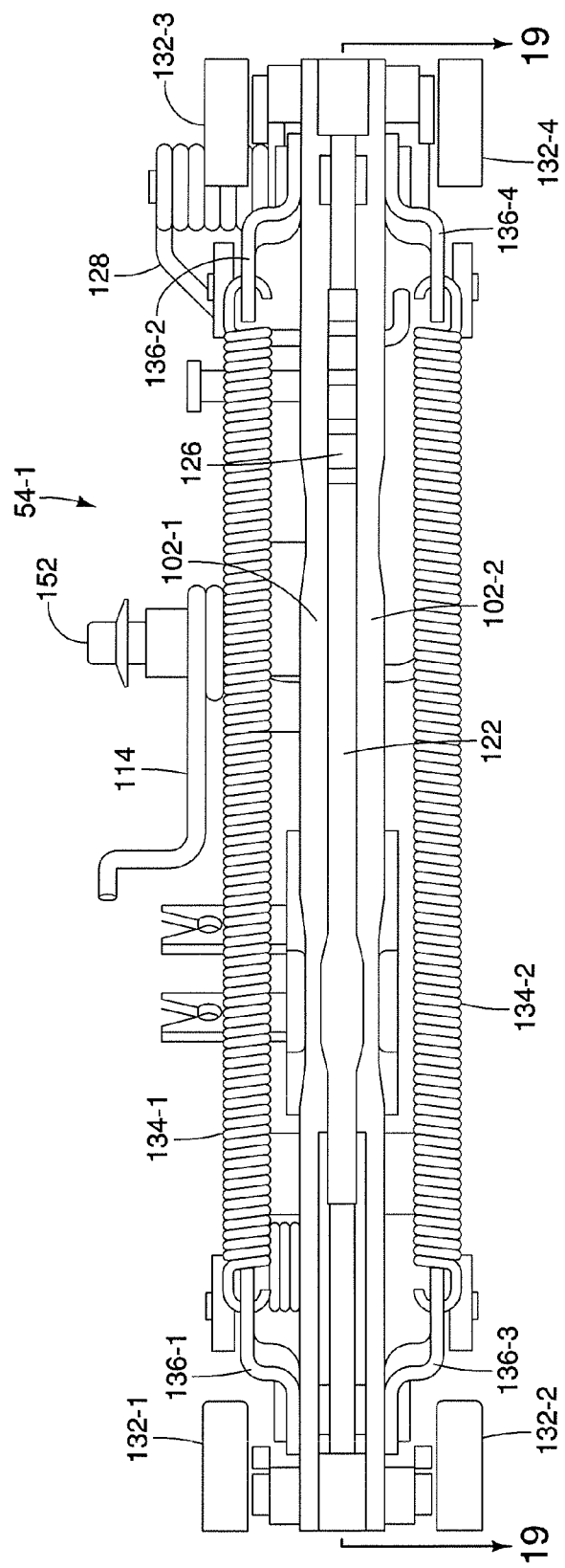
FIG. 15 is a bottom view of a slide carriage on the driver side of the seat frame shown in FIG. 3.
Figure 16:
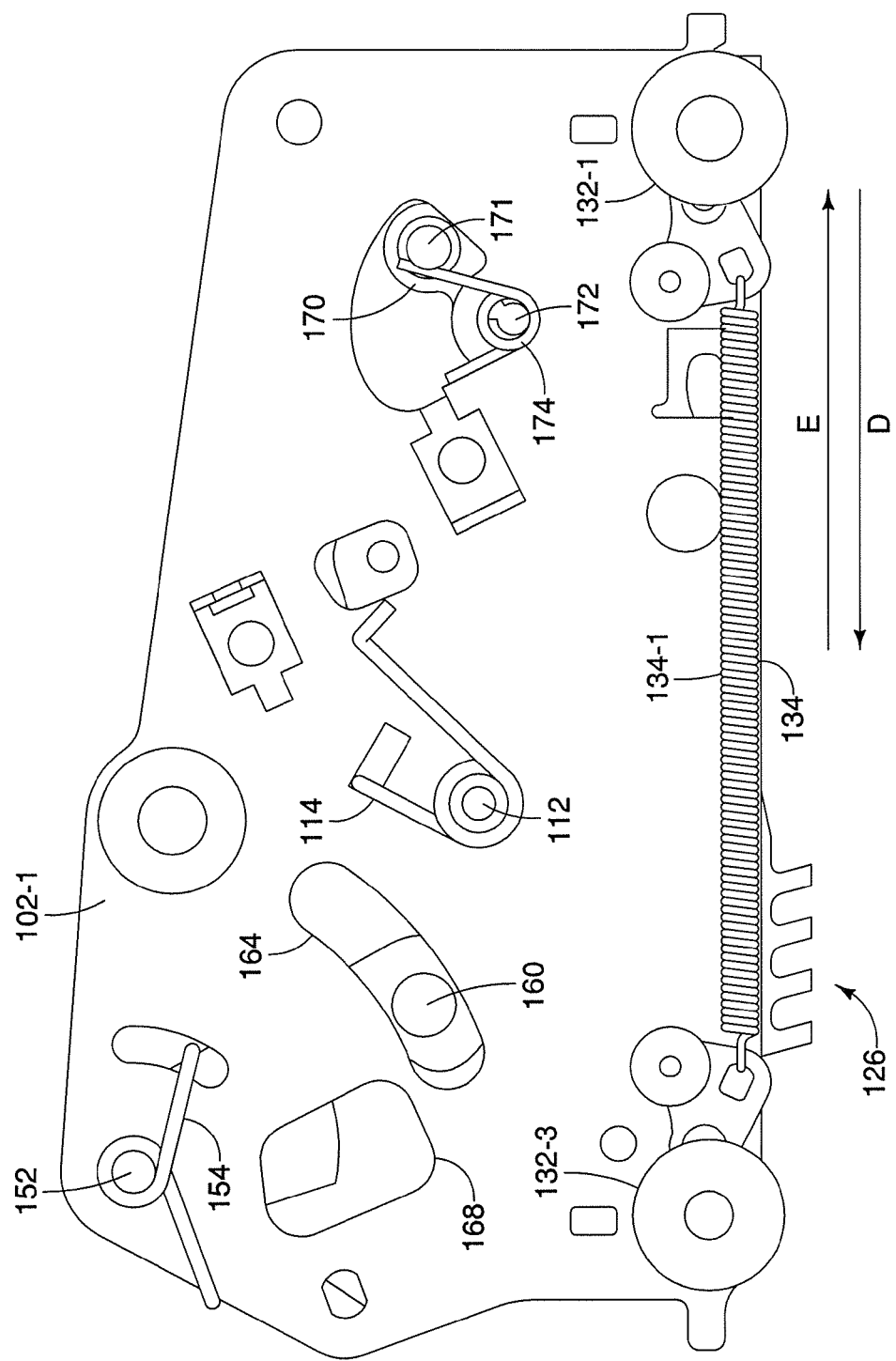
FIG. 16 is an inside elevational view of the slide carriage shown in FIG. 15.
Figure 17:
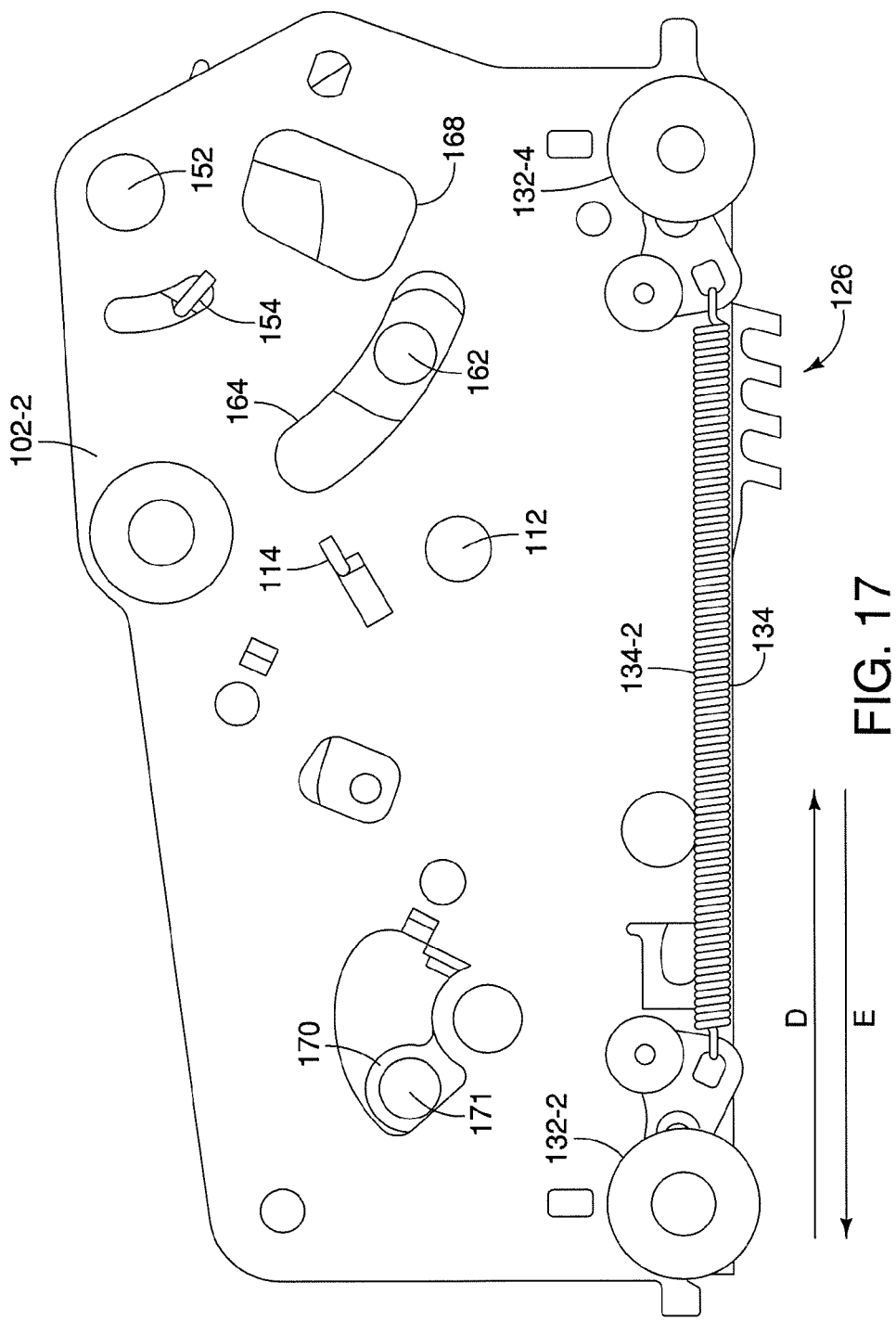
FIG. 17 is an outside elevational view of the slide carriage shown in FIG. 15.
Figure 18:
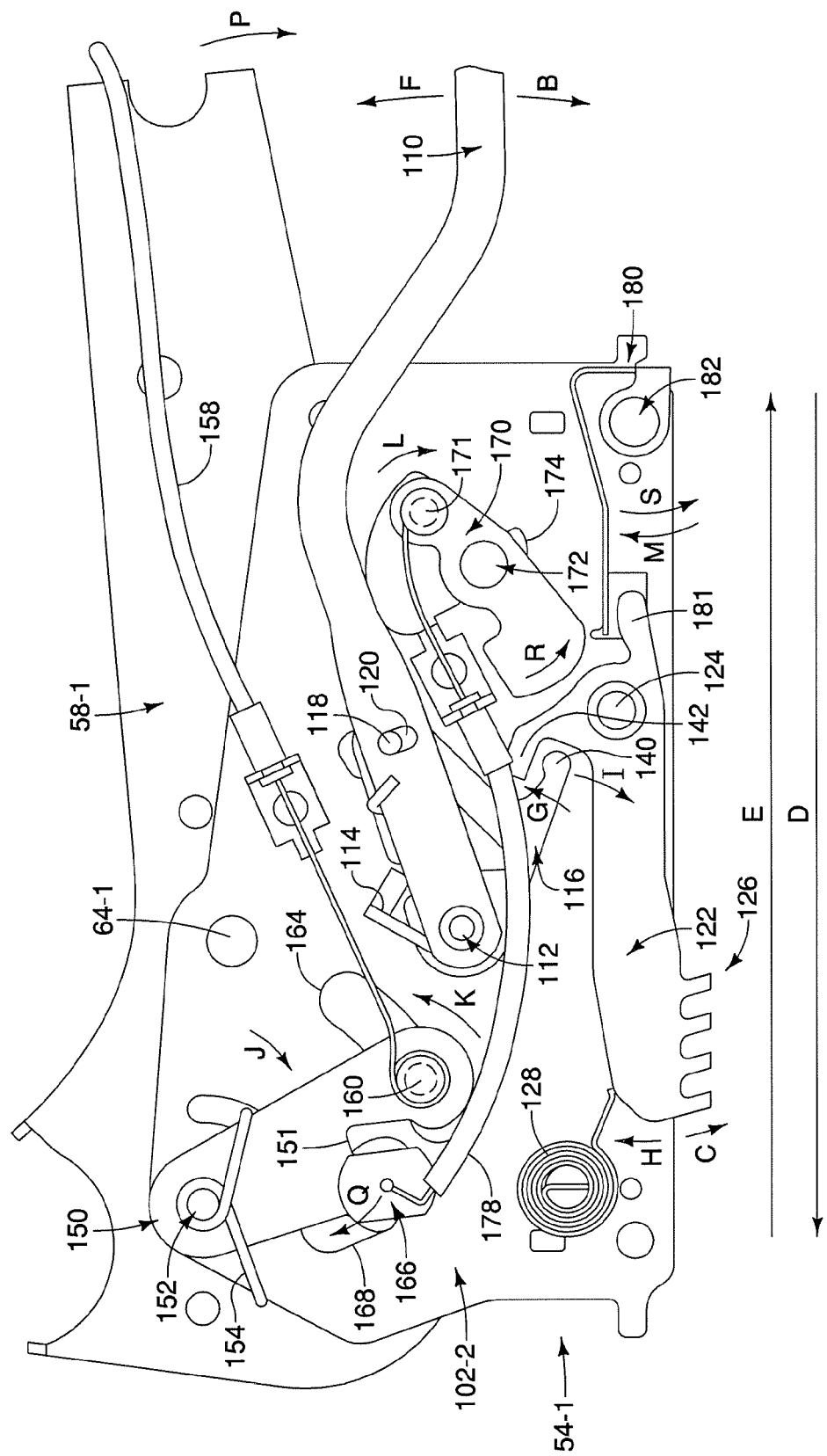
FIG. 18 is a detailed exemplary view of components in the slide carriage shown in FIG. 15.
Figure 19:
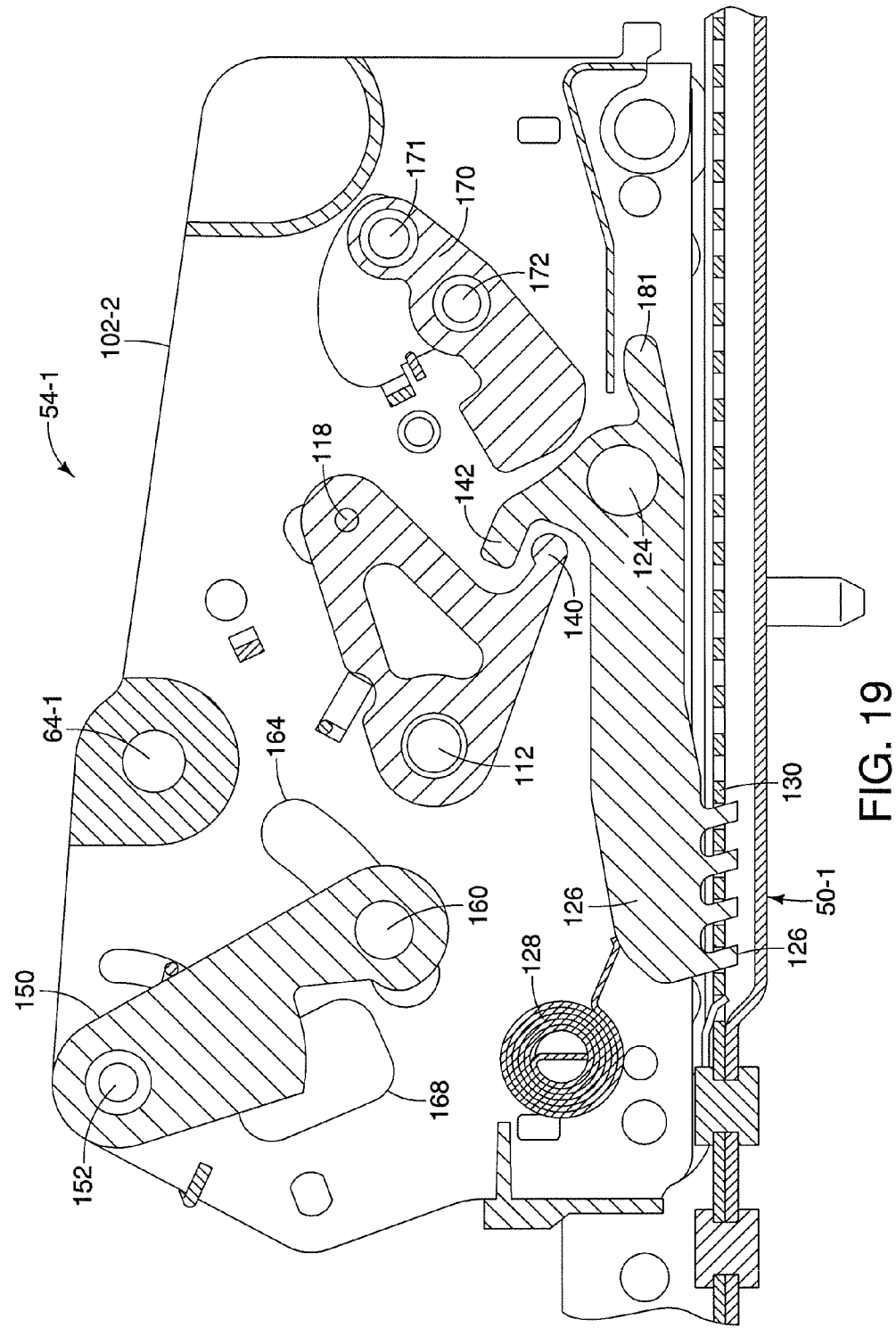
FIG. 19 is a cross-sectional view taken along lines 19-19 in FIG. 15 illustrating an example of engagement of a track release member of the seat frame with a slide track.

FIG. 15 is a bottom view showing an example of components associated with the slide carriages 54. FIG. 16 is an inboard view of the left side slide carriage 54-1, and FIG. 17 is an outboard view of the left side slide carriage 54-1. FIGS. 18 and 19 are schematic depictions of components of the slide carriage 54-1. Although this example shows components associated with the slide carriage 54-1 on the left side (driver side) of the rear seat 18, the slide carriage 54-2 on the right side (passenger side) of the rear seat 18 has similar components. Basically, the slide carriage 54-2 on the right side of the rear seat 18 is a mirror image of the left slide carriage 54-1.

As indicated in FIGS. 15-19, slide carriage 54-1 has a first frame component 102-1 and a second frame component 102-2 which are coupled together by screws, nuts, bolts or any suitable types of fasteners. One end of the manual slide actuator 110 is pivotally coupled at a pivot axis 112 to the slide carriage 54-1 on the left side of the rear seat 18. Similarly, the other end of the manual slide actuator 110 is pivotally coupled at a pivot axis to the slide carriage 54-2 on the right side of the rear seat 18. A biasing member 114, such as a spring, is coupled about the pivot axis 112 in this example, and urges the manual slide actuator 110 in a downward direction B in FIG. 18. The manual slide actuator 110 is further coupled to a bracket 116 that is pivotal about pivot axis 112. In this example, a tab 118 extending from the bracket 116 is received in a slotted opening 120 in the manual slide actuator 110. Accordingly, movement of the manual slide actuator 110 about the pivot axis 112 also moves the bracket 116 about the pivot axis 112.

A track release member 122 is coupled to the slide carriage 54-1 about a pivot axis 124 as shown. The track release member 122 includes serrations or teeth 126. A biasing member 128, such as a spring, biases the track release member 122 in a downward direction indicated by arrow C in FIG. 18. Accordingly, the teeth 126 extend into the groove 56-1 in the associated slide track 50-1, and engage with openings or slots 130 present at the bottom of the groove 56-1 as shown, for example, in FIG. 19. The engagement of the teeth 124 with the slots 130 prevents the slide carriage 54-1 from moving along the groove 56.

As shown in FIGS. 15-17 and 19, a plurality of rollers or wheels 132-1 through 132-4 is pivotally mounted to the side carriage 54 and enables the slide carriage 54 to roll along the top surface of the slide track 50. As further shown, spring 134-1 is coupled between members 136-1 and 136-2, and spring 134-2 is coupled between members 136-3 and 136-4. Members 136-1 through 132-4 are pivotally coupled to slide carriage 54-1 as shown. In addition, any number of the wheels 132-1 through 134-4 can include a conventional biasing or winding member (not shown), such as a spring, as known in the art. This biasing member can be wound to store energy as the wheels 132-1 through 132-4 are turned in a counterclockwise direction, for example, when the slide carriage 54-1 is moved along the slide track 50-1 toward the rear of the vehicle 10 in a direction D. Accordingly, the biasing member will urge the slide carriage 54-1 to move toward the front of the vehicle 10 in a direction E (FIG. 18) that is opposite to direction D. However, the engagement of the teeth 126 of the track release member 122 with the slots 130 in the groove 56-1 prevents the slide carriage 54-1 from moving along the slide track 50-1.

As the manual slide actuator 110 is manually lifted upward in the direction F, the manual slide actuator 110 pivots about pivot axis 112 in a direction G. The pivoting of the manual slide actuator 110 pivots the bracket 116 about pivot axis 112 in direction G. When the bracket 116 pivots about pivot axis 112, a projection 140 on the bracket 116 engages a projection 142 on the track release member 122, and pivots the track release member 122 about pivot axis 124 in a direction H that is opposite to direction C. This pivoting moves the teeth 126 of the track release member 122 out of engagement with the slots 130 in the groove 56. Accordingly, a biasing member associated with one or more of the wheels 132-1 through 132-4 can move the slide carriage 54-1 in the direction E. Furthermore, the slide tracks 50-1 and 50-2 may be mounted in a sloped manner with respect to the horizontal. For instance, the slide tracks 50-1 and 50-2 may be mounted to extend upwardly at an angle with respect to the horizontal in the direction D toward the rear of the vehicle 10, and thus extend downwardly at that angle with respect to the horizontal in the direction E toward the front of the vehicle 10. The angle can be, for example, approximately two degrees or any other suitable angle. Accordingly, the slide carriages 54-1 and 54-2 and thus, the rear seat 18, travel at a two degree upward angle as the rear seat 18 is moved rearward in the direction D. Hence, when the teeth 126 of the track release member 122 of the slide carriages 54-1 and 54-2 are moved out of engagement with the slots 130 in the groove 56 of the respective slide tracks 50-1 and 50-2, the slide carriages 54-1 and 54-2, and thus the rear seat 18, can move forward in the direction E and in the downward angle direction due to gravity. Also, the slide carriage 54-1 can be manually moved along the slide track 50-1 in either direction D or E. Thus, the slide actuator 110 enables sliding movement of the slide carriage 54-1 relative to the slide rail or track 50-1.

When the manual slide actuator 110 is released, the biasing member 114 pivots the manual slide actuator 110 about the pivot axis 112 in the direction B. This pivoting causes the bracket 116 to pivot about pivot axis 112 in a direction I which is opposite to direction G. Accordingly, the projection 140 releases from projection 142, and enables the biasing member 128 to pivot the track release member 122 about pivot axis 124 in the direction C. Thus, the teeth 126 on the track release member 122 will engage the slots 130 in the groove 56-1 and prevent the slide carriage 54-1 from moving along the slide track 50-1 as discussed above.

As further shown in FIGS. 16-19, a tilt bracket 150 is pivotally mounted to the slide carriage 54-1 to pivot about a pivot axis 152. A biasing member 154, such as a spring, biases the tilt bracket 150 in a direction J (FIG. 18). A cable 158 is coupled to a projection 160 that extends from one side of the tilt bracket 150. Another projection 162, as shown in FIG. 18, extends from the tilt bracket 150 into a slotted opening 164 in the slide carriage 54-1. Accordingly, as discussed in more detail below, when the cable 158 applies a pulling force to tilt bracket 150, the pulling force pivots tilt bracket 150 in a direction K (FIG. 18) about pivot axis 152 against the biasing force of biasing member 154. When the pulling force is released, the biasing force of the biasing member 154 pivots tilt bracket 150 in the direction J about pivot axis 152 back to the position as shown, for example, in FIG. 18.

FIG. 18 further illustrates that a framing post 166 extends from support bracket 58-1 into a slotted opening 168 in the slide carriage 54-1. In addition, a link bracket 170 is pivotally mounted to slide carriage 54-1 at a link axis 172. A biasing member 174, such as a spring, biases link bracket 170 to pivot in a direction L about link axis 172. A post 171 extends outwardly from link bracket 170. A cable 178 is coupled between post 171 and framing post 166 as indicated. Accordingly, the cable 178 mechanically couples the framing post 168 to the link bracket 170 for purposes discussed in more detail below. In addition, a slide bracket 180 is pivotally mounted to slide carriage 54-1 to pivot about a slide axis 182.

As mentioned above, FIGS. 15-19 illustrate an example of components associated with the slide carriage 54-1 on the left side of the rear seat 18. Similarly, the components associated with the slide carriage 54-2 on the right side of the rear seat 18 are configured as a mirror image to those shown in FIGS. 15-19 and discussed above. Also, all of the components can be made of metal, such as steel or aluminum, or any other suitable material having sufficient strength and durability. Furthermore, the components can be connected to slide carriages 54-1 and 54-2, and to other components as appropriate, by rivets, nuts, bolts, screws or any other suitable type of connector or fastener.

FIGS. 20-24 illustrate an example of a cabling arrangement in the example of the rear seat 18 discussed herein. The cabling arrangement enables a user to manipulate the rear seat 18 to allow for access to the back seats 20 as will now be discussed.

As shown, the rear seat 18 includes a conventional recline handle 190 that a user can manipulate to adjust the incline of the rear seatback 30. That is, as in a conventional vehicle seat, the recline handle 190 is pivotally coupled to a lower side of the rear seat 18. In this example, the recline handle 190 is pivotally coupled to the lower right side of the rear seat 18. However, the recline handle 190 can instead be coupled to the lower left side of the rear seat 18, or be positioned at any other suitable location.

Figure 23:
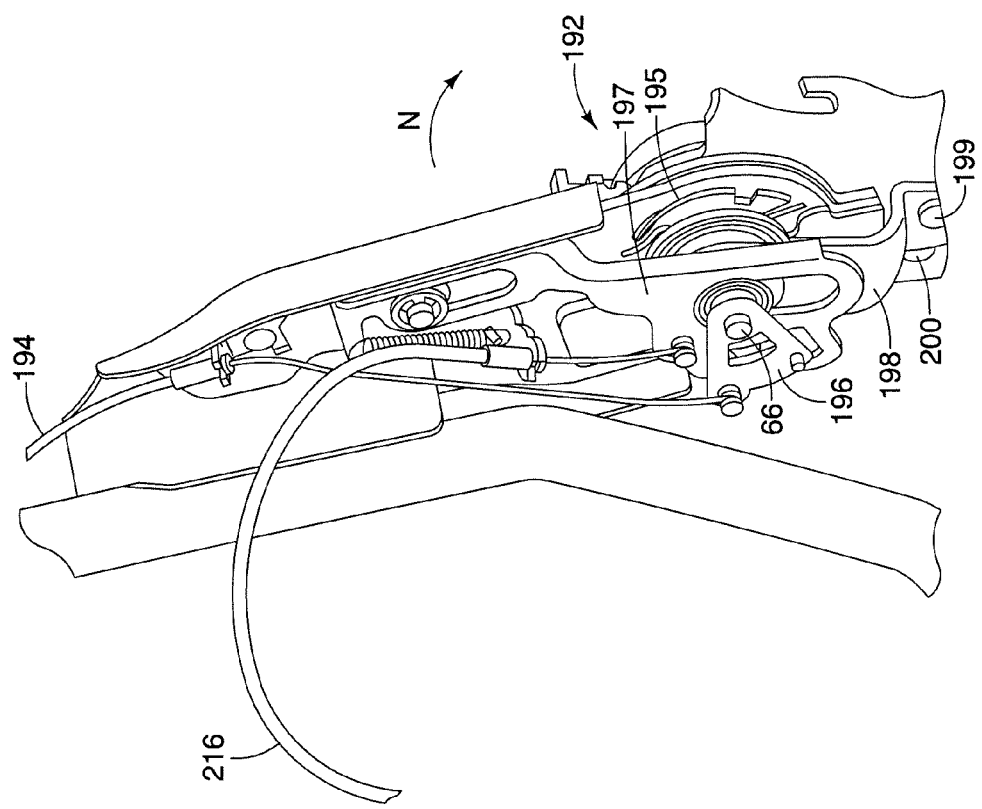
FIG. 23 is a detailed perspective view of an exemplary recline mechanism of the seat frame.

The recline handle 190 is coupled to a recline mechanism 192 by a cable 194. In this example, the recline mechanism 192 is shown on the driver side of the rear seat 18. However, a recline mechanism 192 can be present at the passenger side of the rear seat 18, or a recline mechanism 192 can be present at both the driver side and passenger side of the rear seat. The recline mechanism 192 in this example can be a conventional recline mechanism as known in the art. For example, the recline mechanism 192 can include a biasing member 195, such as a spring, that biases the rear seatback 30 to pivot in a forward direction N about seatback axis 66. A recline bracket 196 engages the seatback frame 60 and prevents the biasing member 195 from moving the rear seatback 30 in the forward direction N (FIG. 23). However, when the recline handle 190 is manipulated for reclining the rear seatback 30 (e.g., the recline handle 190 is lifted), the cable 194 applies a pulling force to the recline bracket 196. This pulling force disengages the recline bracket 196 from the seatback frame 60, thereby allowing the biasing member 195 to move the rear seatback 30 in the direction N. Thus, the recline handle 190 is configured to enable rotational movement of the seatback frame 60, and the rear seatback 30, relative to the support brackets 58-1 and 58-2 about the second axis 66-1 and 66-2.

Also, as understood in the art, the user can grab the rear seatback 30 to adjust the rear seatback 30 to the proper angular orientation as desired. Furthermore, when the recline handle 190 is manipulated (e.g., lifted), the user can push the rear seatback 30 back against the biasing force of the biasing member 195 to position the rear seatback 30 in the upright position.

The rear seat 18 further includes an access actuator 202. In this example, the access actuator 202 is coupled to the passenger side of the seatback frame component 60. For example, the access actuator 202 is mounted on an outer surface of the rear seat 18.

However, the access actuator 202 can be positioned at any suitable location. In this example, the access actuator 202 includes a handle 203 that is pivotally coupled to the access actuator 202 at a pivot axis 204. A biasing member 206, such as a spring, biases the handle 203 toward a rest position 208. The handle 203 can be moved upward along a slot 210 to an actuated position 212, and thus pivoted about the pivot axis 204. A cable system 214 is coupled to the handle 203. In this example, the cable system 214 includes a plurality of cables that are routed to the tilt brackets 150 of the slide carriages 54 on the left side and right side of the rear seat 18, and to the recline mechanism 192 as discussed above. For example, the cable system 214 includes the cables 158 that are coupled to the tilt brackets 150 of the slide carriages 54-1 and 54-2 on the left side and right side of the rear seat 18. Furthermore, the cable system 214 includes a cable 216 that couples the handle 203 to the recline mechanism 192, as will now be discussed in more detail.

As shown in FIG. 23, the handle 203 of the access actuator 202 is coupled to the recline mechanism 192 by a cable 216. A clutch bracket 197 is biased to a position that disengages a bridge bracket 198 from the seatback frame 60. Thus, when the clutch bracket 197 is in the biased position shown in FIG. 23, the bridge bracket 198 does not move with the seatback frame 60 when the recline handle 190 is manipulated. However, when the handle 203 is moved to the actuated position 212, the cable 216 applies a pulling force to the clutch bracket 197. This pulling force causes the bridge bracket 198 to engage the seatback frame 60 such that movement of the bridge bracket 198 is tied to movement of the seatback frame 60. At the same time the pulling force moves the recline bracket 196 about the seatback axis 66-1, which consequently moves the bridge bracket 198 about the seatback axis 66-1.

As discussed above, movement of the recline bracket 196 about the seatback axis 66-1 disengages the recline bracket 196 from the seatback frame 60. Additionally, a post 199 extends outwardly from the bridge bracket 198 through a slotted opening 200 in support bracket 58-1 as shown by example in FIG. 24. One end of the release cable 100 is coupled to the post 199. A biasing member 201, such as a spring, assists in biasing the bridge bracket 198 such that the post 199 is positioned at one end of the slotted opening 200. When the bridge bracket 198 moves about the seatback axis 66-1 with the seatback frame 60 as discussed above, the post 199 moves along slot 200 in the direction O. This movement causes post 199 to exert a pulling force on release cable 100 to remove the catch 88 from engagement with the cushion striker 82 as discussed above and in more detail below. Consequently, the catch 88 of the cushion latch 88 will not be removed from engagement with the cushion striker 82 unless the seatback frame 60 pivots forward in the direction N. The cable system 214 can optionally include one or more splitting devices (not shown) that divert a pulling force on a single cable to multiple locations as necessary or desirable.

An example of an operation of the rear seat 18 as controlled by the access actuator 202 will now be discussed. For exemplary purposes, the operations primarily will be discussed with regard to the components of slide carriage 54-1. However, similar operations occur with the components of slide carriage 54-2.

As discussed above, each support bracket 58-1 and 58-2 is coupled to a respective one of the slide carriages 54-1 and 54-2 at a respective bracket axis 64-1 and 64-2. It should also be noted that as mentioned above, the support brackets 58-1 and 58-2 can be gravitationally biased to pivot toward a downward direction P (FIG. 18). Alternatively, or in addition, a respective biasing member (not shown), such as a spring, can bias each support bracket 58-1 and 58-2 to pivot about bracket axis 64-1 and 64-2 in a downward direction P. However, each tilt bracket 150 includes a notch 151 that engages a respective framing post 166 to prevent the support brackets 58-1 and 58-2 from moving in the downward direction P.

When the handle 203 is moved from the rest position 208 to the actuated position 212, the movement of the handle 203 exerts a pulling force on the cable system 214. This pulling force is applied to cables 158 and 216 as discussed above. It should also be noted that once the handle 203 has been moved to the actuated position 212 and the operations below occur, the biasing member 206 can return the handle to the rest position 208.

As can be appreciated from FIG. 18, when cables 158 pull tilt brackets 150, the tilt brackets 150 pivot in the direction K about their respective pivot axis 152. Accordingly, each framing post 166 is released from the notch 151 of the respective tilt bracket 150, and are able to move in a direction Q in their respective slotted opening 168. When this occurs, the support brackets 58-1 and 58-2 tilt in the direction P (i.e., forward toward the front of the vehicle 10) from their original vertical and horizontal vector directions 59 and 61 by a tilt angle α to tilted bracket positions as shown, for example, in FIG. 26. Therefore, the rear seat 18 tilts forward by the tilt angle α. By way of example, the tilt angle α may be approximately 14 degrees or a different value as needed or desired. Hence, the access actuator 20 enables rotational movement of the support brackets 58-1 and 58-2 relative to the base portion (e.g., slide carriages 54-1 and 54-2) about the first axis (bracket axis 64-1 and 64-2).

The movement of framing posts 166 in the direction Q also exerts a pulling force on cable 178, which pivots link bracket 170 in a direction R about link axis 172. Accordingly, the link bracket 170 contacts the slide bracket 180 and pivots the slide bracket 180 in a direction S about the slide axis 182, which is opposite of a direction M in which the track release member 122 urges the slide bracket 180 when the track release member 122 engages the slide rail 50-1. Accordingly, the slide bracket 180 contacts a projection 181 on the track release member 122, and pivots the track release member 122 about pivot axis 124 in the direction H (FIG. 18). This pivoting moves the teeth 126 of the track release member 122 out of engagement with the slots 130 in the groove 56-1 as discussed above. Accordingly, the biasing member(s) associated with one or more of the wheels 132 can urge the slide carriage 54-1 in the direction E as discussed above. Similar operations occur with regard to the component of slide carriage 54-2. Alternatively, or in addition, the slide tracks 50-1 and 50-2 can be angled in the manner as discussed above. Accordingly, slide carriages 54-1 and 54-2 are free to move in the direction E. Thus, rotational movement of the support brackets 58-1 and 58-2 relative to the base portion enables sliding movement of the slide carriage 54-1 and 54-2 relative to the slide rails 50-1 and 50-2.

Figure 20:
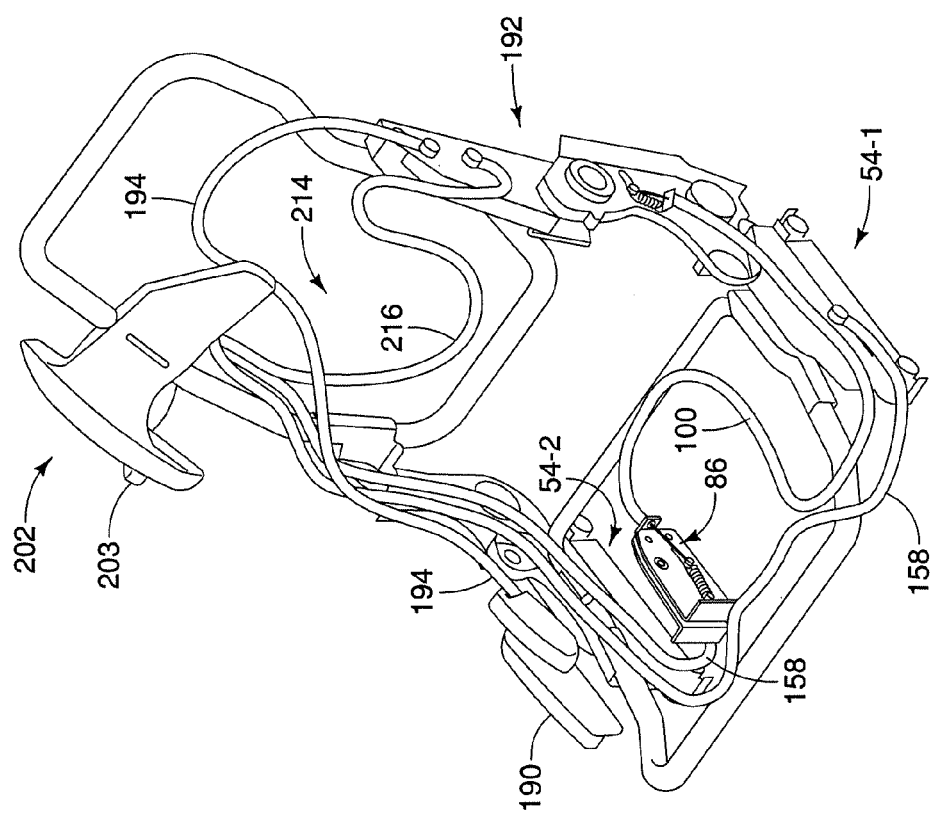
FIG. 20 is a perspective view of the seat frame showing an exemplary cabling arrangement.
Figure 21:
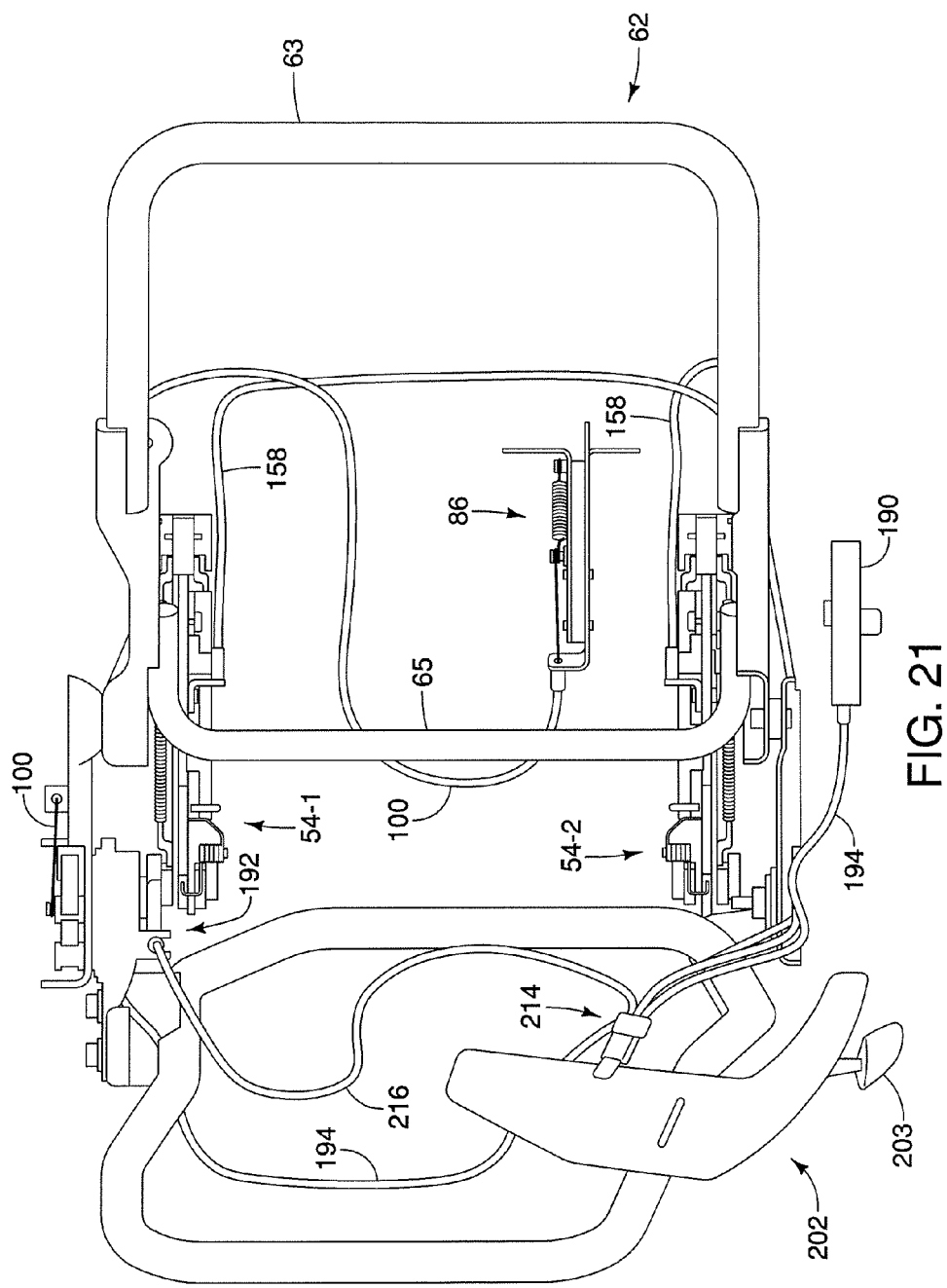
FIG. 21 is a top view of the seat frame showing an exemplary cabling arrangement.
Figure 22:
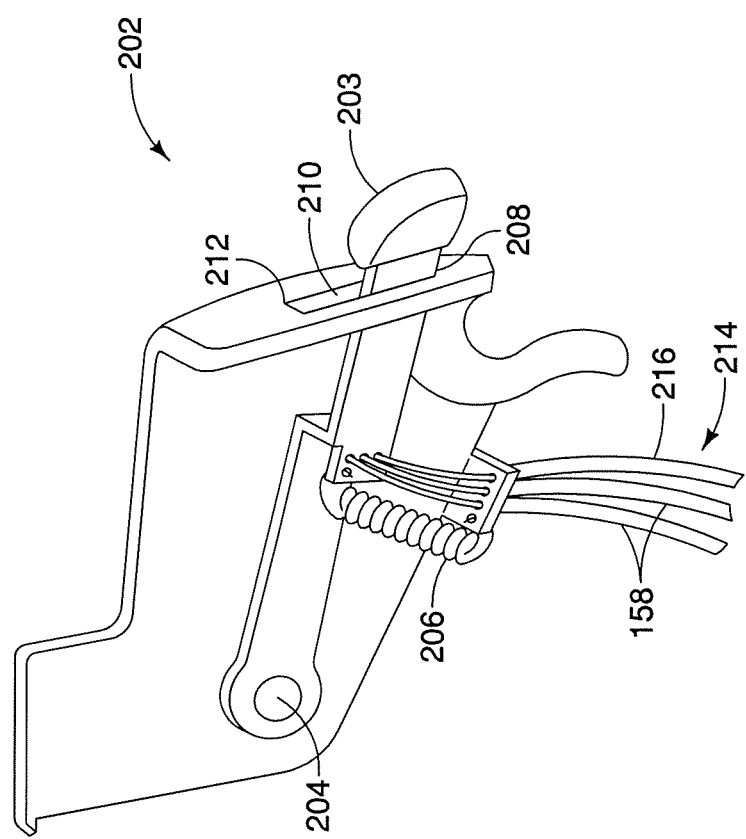
FIG. 22 is a detailed perspective view of an exemplary access actuator coupled to the seat frame.
Figure 24:
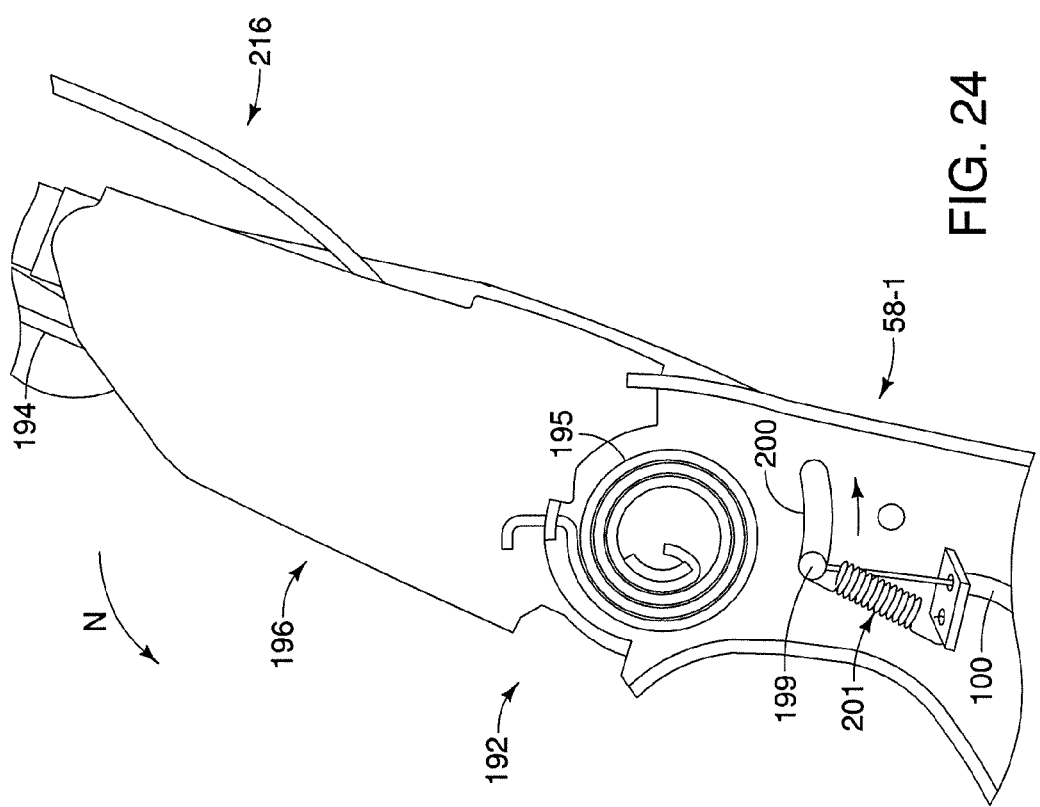
FIG. 24 is a side elevational view of the recline mechanism as taken from the driver side of the seat frame.
Figure 25:
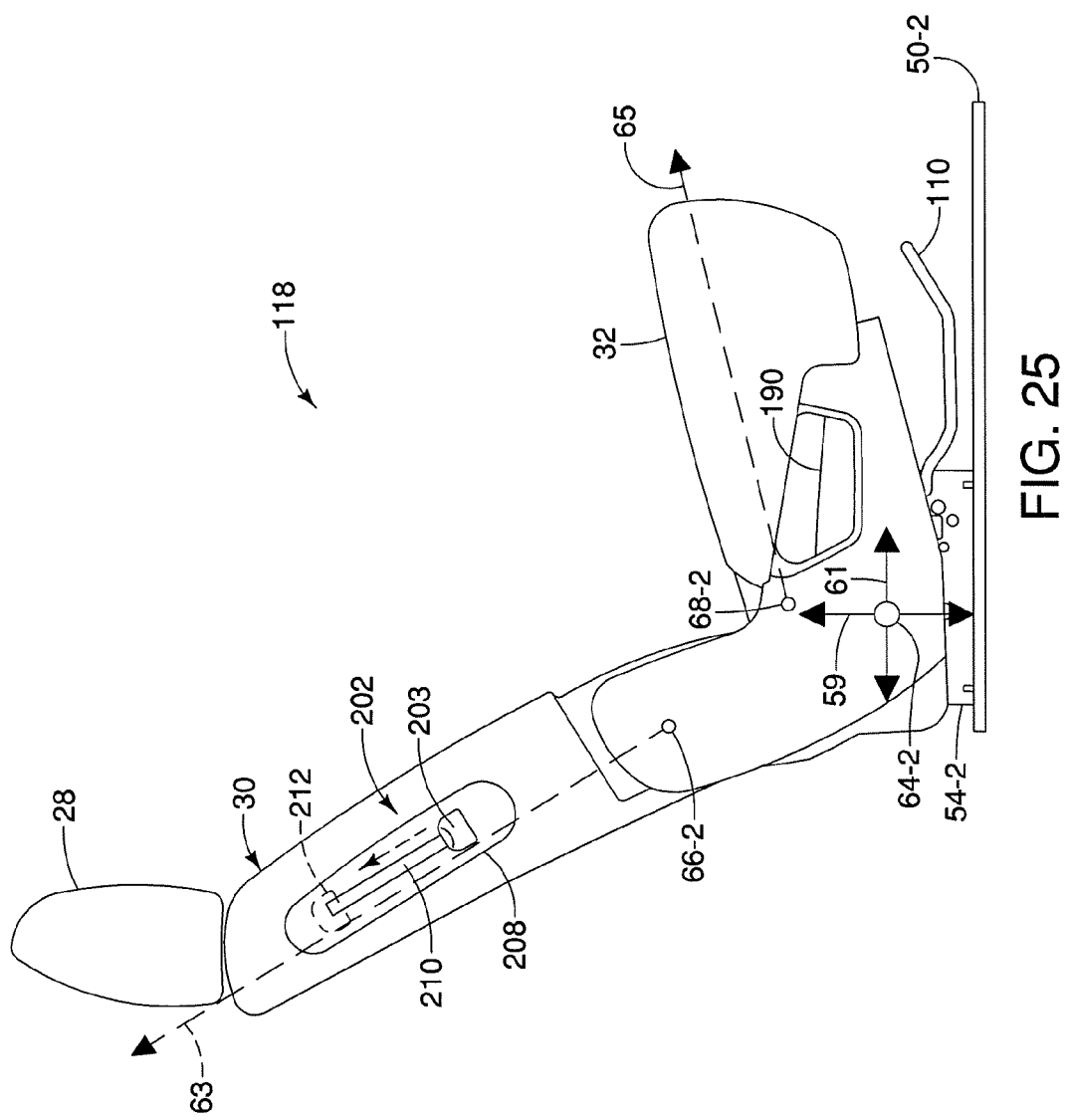
FIG. 25 is a side elevational view of the rear seat taken from the passenger side of the vehicle illustrating the pivot axes associated with the seat frame and a seat adjustment actuator.

In addition, as can be appreciated from FIGS. 20 and 21, movement of the handle 203 from the rest position 208 to the actuated position 212 exerts a pulling force on the clutch bracket 197 through cable 216 of the cable system 214. This pulling force disengages the recline bracket 196 from the seatback frame 60 to allow the biasing member 195 to move the rear seatback 30 in the direction N as shown in FIGS. 23, 24 and 26. Accordingly, the rear seatback 30 can tilt forward towards the front of the vehicle 10 from the upright position in the rear seatback vector direction 63 by a fold angle β to tilted bracket positions 222 as shown, for example, in FIG. 26. Fold angle β may be, for example, approximately 26 degrees or a different value as needed or desired. Thus, the access actuator 202 is further configured to enable rotational movement of the seatback frame 60, and the rear seatback 30, relative to the support brackets 54-1 and 54-2 about the second axis 66-1 and 66-2. It should also be noted that the fold angle β can be greater or less depending on, for example, the degree to which the rear seatback 30 was reclined before being tilted forward by the biasing member 195. Also, as discussed in more detail below, an object present on the rear seat 18 can inhibit tilting of the rear seatback 30. Hence, the fold angle β can be as low as zero degrees if the object completely prevents the rear seatback 30 from tilting forward.

As discussed above, the bridge bracket 198 moves with the seatback frame 60 about seatback axis 66-1 when the pulling force through cable 216 is exerted on the clutch bracket 197. Furthermore, as can be appreciated from FIGS. 5-14, 20-24 and 26, movement of bridge bracket 198 moves the post 199 to exert a pulling force on release cable 100. This pulling force on release cable 100 disengages the catch 88 from the cushion striker 82 as discussed above. When the catch 88 is disengaged from the cushion striker 82, the biasing member 76 urges the cushion frame component 62, and thus, the rear seat cushion 32, to pivot about cushion axes 68 in a direction A from the in use position extending in the rear cushion vector direction 65 by a lift angle δ to a flipped up position 224 as shown, for example, in FIG. 26. Lift angle δ may be, for example, approximately 68 degrees or a different value as needed or desired. Thus, the access actuator 202 is further configured to enable rotational movement of the cushion frame 62, and the rear cushion 32, relative to the support brackets 58-1 and 58-2 about the third axis. It should also be noted that the lift angle δ can be greater or less depending on, for example, whether an object present on the rear seat 18 can inhibit lifting of the rear seat cushion 32. For instance, the lift angle δ can be as low as zero degrees if the object completely prevents the rear seat cushion 32 from lifting up.

Figure 27:
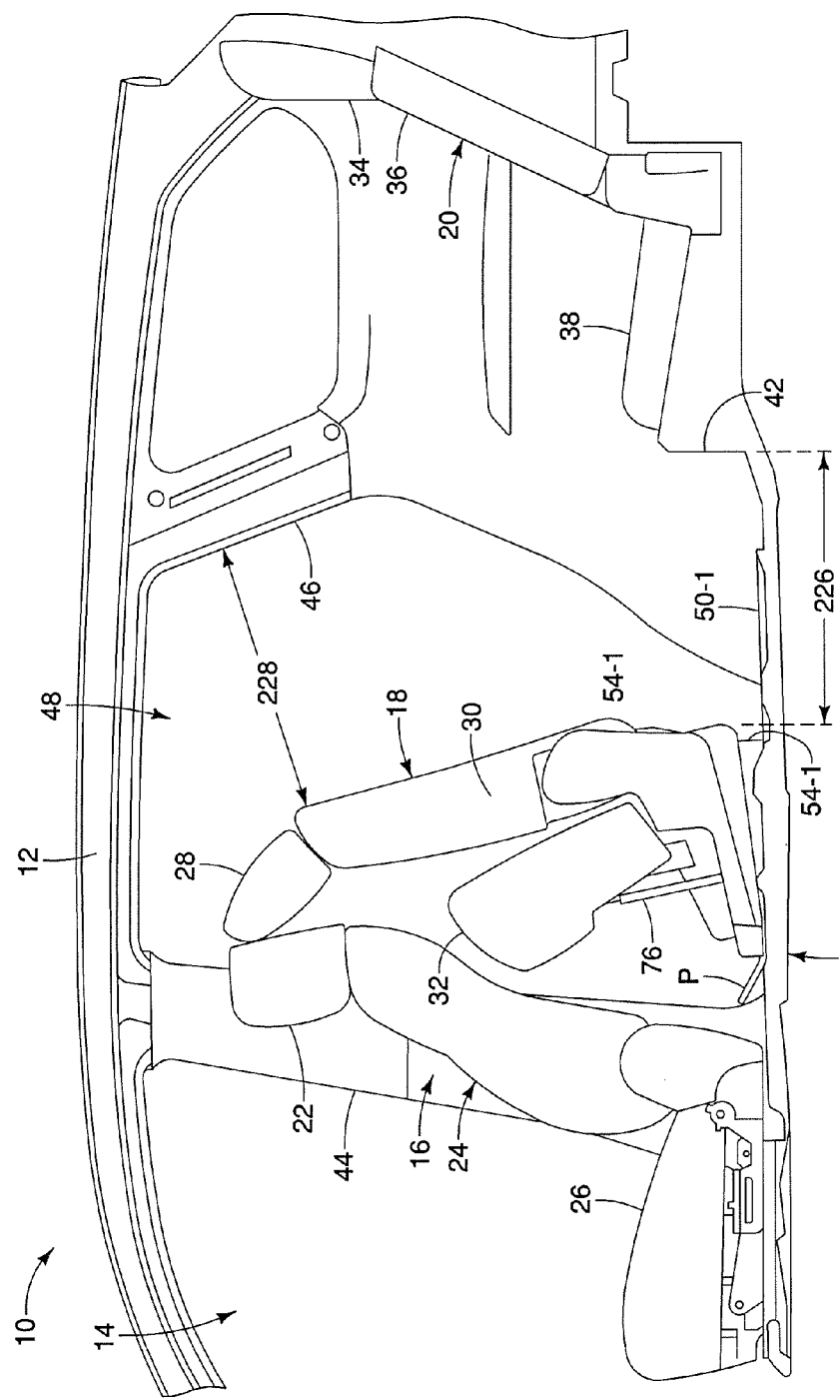
FIG. 27 is a side elevational view of the vehicle seating arrangement taken from the driver side and showing the rear seat in the enhanced access position.

Therefore, as shown in FIG. 27, the tilting of the support brackets 58, rear seatback 30 and rear seat cushion 32 provides an enhanced access space 226 between the rear seat 18 and the stepped surface 42 proximate to the third row seats 20. In this example, the enhanced access space 226 may be approximately 476 mm when the rear seat 18 is not obstructed by an object. However, the enhanced access space 226 can be any suitable distance as necessary or desired.

The titling also provides an enhanced pillar clearance space 228 between the rear seat 18 and the vehicle C-pillar 46. In this example, the enhanced pillar clearance space 228 may be approximately 603 mm when the rear seat 18 is not obstructed by an object. However, the enhanced pillar clearance space 228 can be any suitable distance as necessary or desired. Therefore, a user can more easily access the third row seats 20 via, for example, the vehicle side door opening 48.

Figure 28:
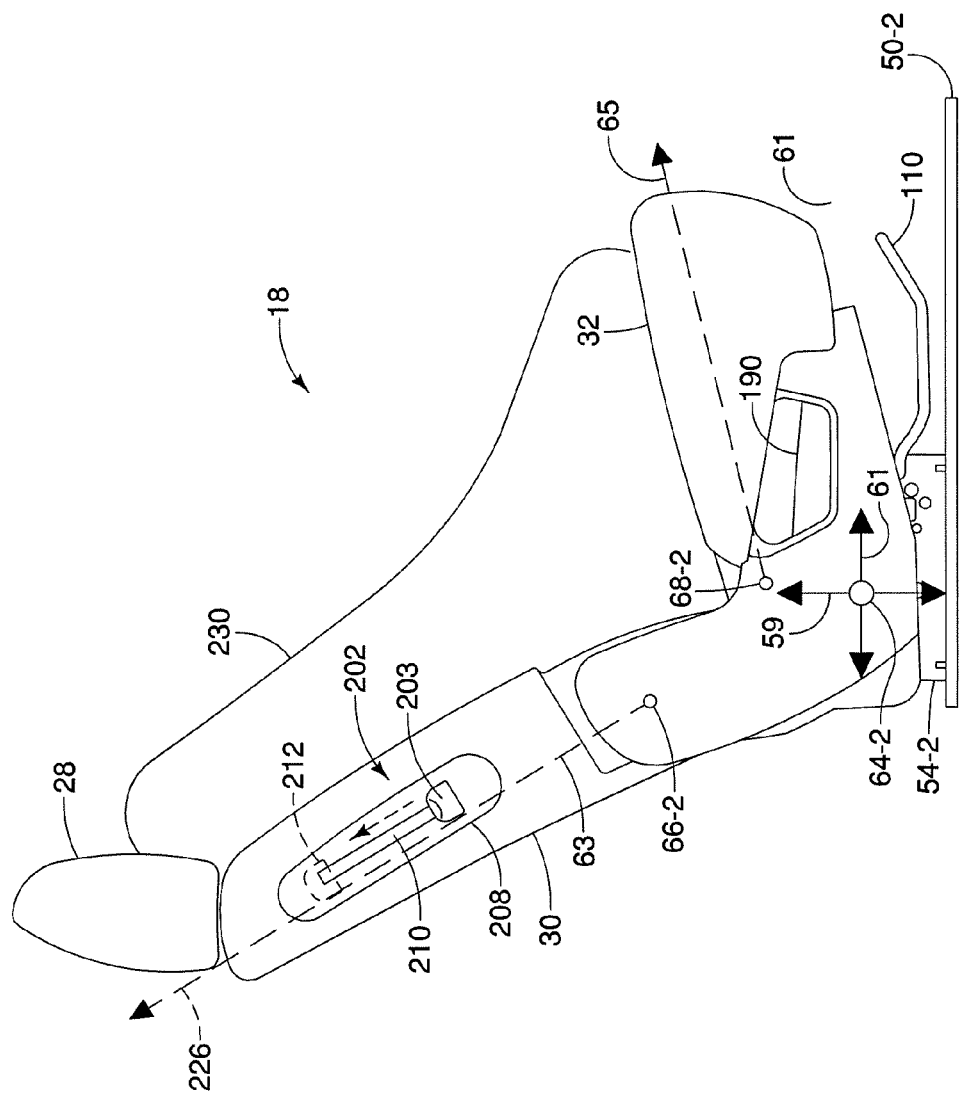
FIG. 28 is a side elevational view of the rear seat taken from the passenger side illustrating operation of the seat adjustment actuator while the rear seat is obstructed.
Figure 29:
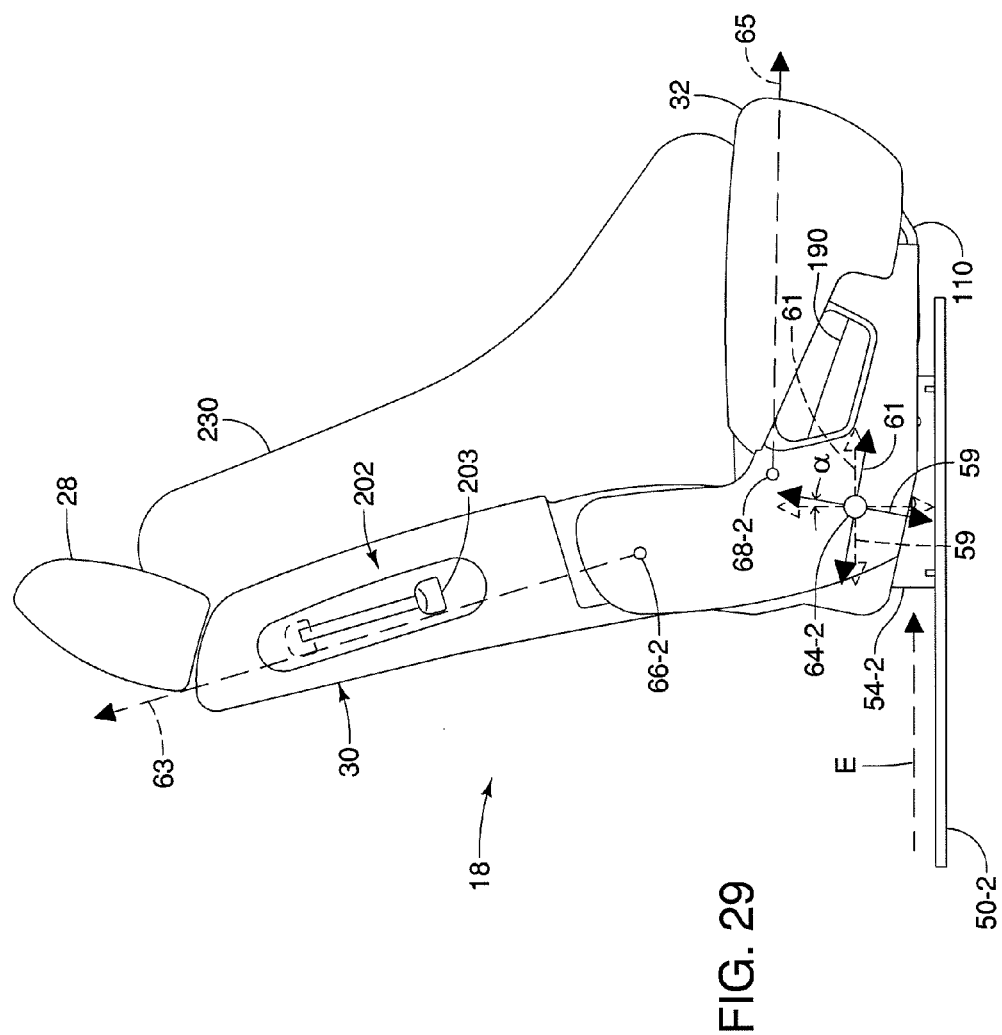
FIG. 29 is a side elevational view of the obstructed rear seat in an enhanced access position after the seat adjustment actuator is operated.
Figure 30:
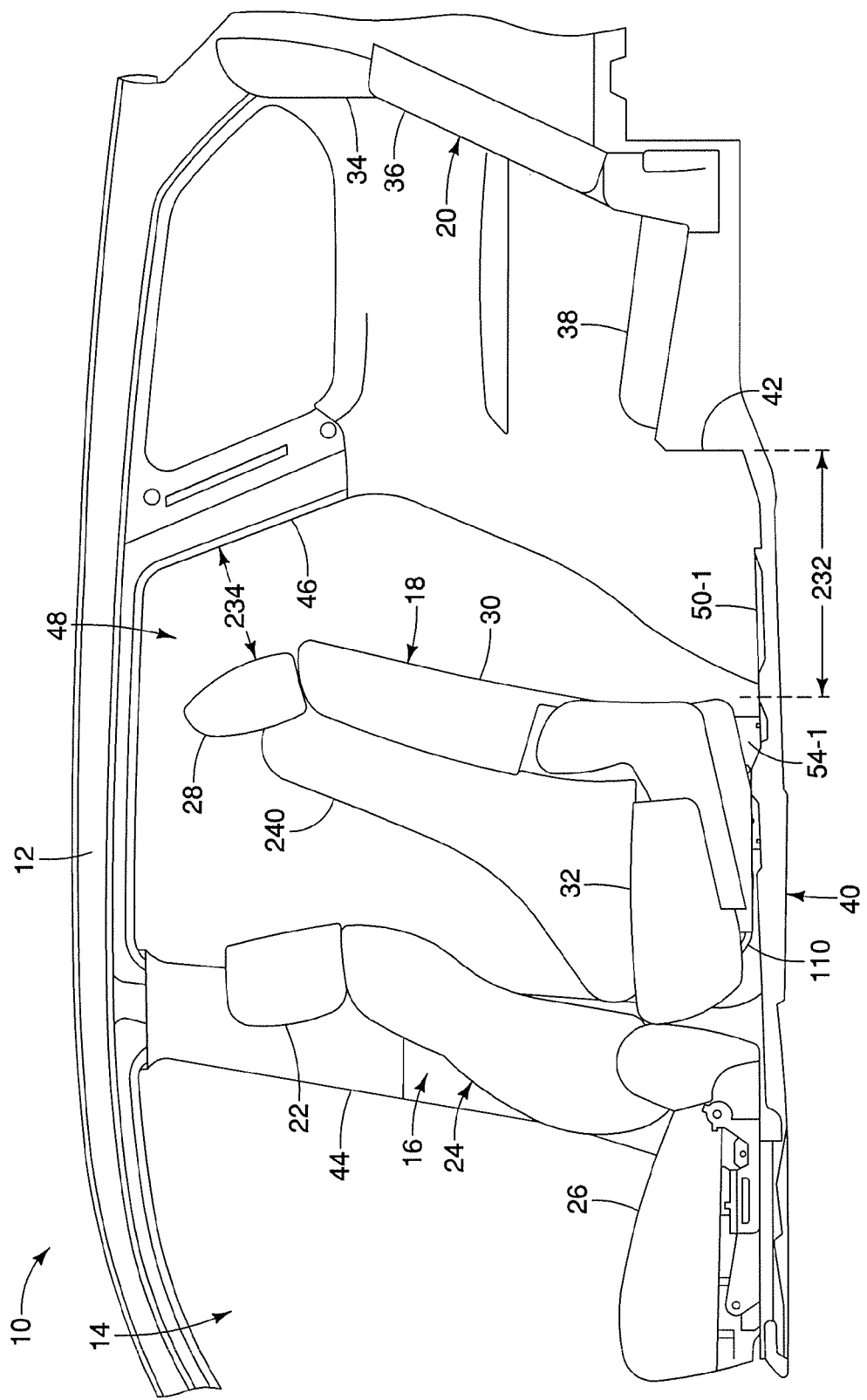
FIG. 30 is a side elevational view of the vehicle seating arrangement taken from the driver side and showing the obstructed rear seat in the enhanced access position.

It should also be noted that the vehicle seat assembly 18 according to the embodiments described herein provides enhanced access to the third row seats 20 even when a rigid obstacle is present on rear seat 18. That is, as shown in FIGS. 28-30, an occupying article 230, such as a child seat or another object might be present on rear seat 18. In this situation, when the handle 203 is moved from the rest position 208 to the actuated position 212, the movement of the handle 203 exerts a pulling force on cables 158 and 216 of cable system 214 as discussed above. It should be understood that although the occupying article 230 is shown contacting the rear headrest 28 in FIGS. 28-30, the rear headrest 28 might need to be removed for clearance purposes in the event that a child seat or other rigid object would otherwise contact the rear headrest 28 while resting on the rear cushion 32.

However, as discussed above, the catch 88 of the cushion latch 88 will not be removed from engagement with the cushion striker 82 unless the seatback frame 60 pivots forward in the direction N. Therefore, even though the pulling force on the clutch bracket 197 through cable 216 disengages the recline bracket 196 from the seatback frame 60, the weight and/or obstruction of the occupying article 230 may prevent the rear seatback 30 from tilting forward, which will consequently prevent the cushion latch 86 from opening and thus prevent the biasing member 76 from lifting the rear seat cushion 32 upward. Also, the latch 86 may be configured with a mechanical or electrical weight sensing mechanism (not shown) that can sense, for example, the force imposed on the latch 86 by cushion striker 82 due to the weight of the occupying article 230 on the rear seat 18. The weight sensing mechanism can, for example, prevent the cushion striker 82 from disengaging the latch 86 when the weight of the occupying article 230 is above a certain threshold even if the release cable 100 disengages or attempts to disengage the catch 88 from the cushion striker 82. Nevertheless, the pulling force on the cables 158 causes the support brackets 58-1 and 58-2 to tilt forward toward the front of the vehicle 10 by the tilt angle α as discussed above and shown, for example, in FIG. 29. Accordingly, the rear seat 18 with the occupying article 230 tilts forward by the tilt angle α. Therefore, an enhanced access space 232 is provided between the rear seat 18 and the stepped surface 42 proximate to the third row seats 20. In this example, the enhanced access space 232 may be approximately 432 mm when the rear seat 18 is obstructed by an object, such as occupying article 230. However, the enhanced access space 232 can be any suitable distance as necessary or desired.

Moreover, an enhanced pillar clearance space 234 is provided between the rear seat 18 and the vehicle C-pillar 46. In this example, the enhanced pillar clearance space 234 may be approximately 359 mm when the rear seat 18 is obstructed by an object, such as occupying article 230. However, the enhanced pillar clearance space 234 can be any suitable distance as necessary or desired. Hence, a user can still easily access the third row seats 20 via, for example, the vehicle side door opening 48.

As can be appreciated from the above, a vehicle seat assembly according to the embodiments described herein allows for maximized access to a third row of seats 20, whether or not a second row of seats 18 is obstructed. During a normal access configuration, a handle 203 mounted on a side of a second row seat 18 is actuated. The seatback 30 then folds forward, the seat cushion 32 flips up to meet the seatback 30, the entire seatback/cushion assembly pivots forward, and the seat assembly 18 is then able to slide forward. This presents an optimal access path to the third row seats 20 when the second row seat 18 is unobstructed. Additionally, even when the second row seat 18 is obstructed by a child seat or another rigid object, the vehicle seat assembly 18 provides enhanced access to the third row seats 20. For example, even if an obstacle prevents the seatback 30 from tilting forward and thus prevents the cushion latch 86 from opening, the complete second seat assembly 18 is still able to pivot forward and is then capable of sliding forward. This allows for increased access to the third row seats 20 under all circumstances by actuation of a single handle 20.

General Interpretation Of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. Also as used herein to describe the above embodiments, the following directional terms "forward", "rearward", "above", "downward", "vertical", "horizontal", "below" and "transverse" as well as any other similar directional terms refer to those directions of a vehicle equipped with the vehicle seat assembly. Accordingly, these terms, as utilized to describe the present invention should be interpreted relative to a vehicle equipped with the vehicle seat assembly. The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments of the present invention are provided for illustration only, and not for the purpose of limiting the invention as defined by the appended claims and their equivalents.

What is claimed is:

1. A vehicle seat assembly comprising:
    a base portion;
    a support bracket pivotally coupled to the base portion about a first axis, the support bracket having a distal end that moves between a position vertically above the first axis to a position vertically below the first axis as the support bracket pivots about the first axis;
    a seatback frame pivotally coupled to the support bracket about a second axis that is spaced apart from the first axis; and
    a cushion frame pivotally coupled to the support bracket about a third axis that is spaced apart from both the first and second axes, such that the seatback frame and the cushion frame move with the support bracket relative to the base portion when the support bracket pivots about the first axis, and the cushion frame is further pivotable relative to the support bracket while the support bracket is stationary relative to the base portion.

2. The vehicle seat assembly according to claim 1, wherein the cushion frame extends from the third axis to a cantilevered free end.

3. The vehicle seat assembly according to claim 1, wherein the base portion is mounted between a front seat and a back seat relative to a longitudinal direction of a vehicle including the vehicle seat assembly.

4. The vehicle seat assembly according to claim 1, further comprising
    a recline handle configured to enable rotational movement of the seatback frame relative to the support bracket about the second axis.

5. The vehicle seat assembly according to claim 1, further comprising
    a biasing member configured to bias the cushion frame into a lifted position.

6. The vehicle seat assembly according to claim 1, wherein the base portion is configured to mount the vehicle seat assembly adjacent to a door opening in a vehicle including the vehicle seat assembly.

7. The vehicle seat assembly according to claim 1, wherein the base portion is configured to mount the seat assembly between a B-pillar and a C-pillar of a vehicle including the vehicle seat assembly.

8. The vehicle seat assembly according to claim 1, wherein the seatback frame extends upward from the support bracket.

9. The vehicle seat assembly according to claim 8, wherein the cushion frame extends laterally outward from the support bracket at the third axis, the third axis being situated below the seatback frame.

10. The vehicle seat assembly according to claim 1, wherein
    the base portion is mounted to a floor structure of a vehicle including the vehicle seat assembly.

11. The vehicle seat assembly according to claim 10, wherein
    the floor structure of the vehicle includes a slide rail, and the base portion includes a slide carriage slidably engaging the slide rail; and
    the base portion is configured to move along the slide rail parallel to a fore-to-aft direction of the vehicle in order to collectively move the vehicle seat assembly parallel to the fore-to-aft direction.

12. The vehicle seat assembly according to claim 10, wherein
    the floor structure of the vehicle includes a slide rail, and the base portion includes a slide carriage slidably engaging the slide rail; and
    the vehicle seat assembly further comprises a slide actuator that enables sliding movement of the slide carriage relative to the slide rail.

13. A vehicle seat assembly comprising:
    a base portion mounted to a floor structure of a vehicle including the vehicle seat assembly, the floor structure of the vehicle including a slide rail, and the base portion including a slide carriage slidably engaging the slide rail;
    a support bracket pivotally coupled to the base portion about a first axis, such that rotational movement of the support bracket relative to the base portion enables sliding movement of the slide carriage relative to the slide rail;
    a seatback frame pivotally coupled to the support bracket about a second axis that is spaced apart from the first axis; and
    a cushion frame pivotally coupled to the support bracket about a third axis that is spaced apart from both the first and second axes, such that the seatback frame and the cushion frame move with the support bracket relative to the base portion when the support bracket pivots about the first axis.

14. A vehicle seat assembly comprising
    a base portion;
    a support bracket pivotally coupled to the base portion about a first axis;
    a seatback frame pivotally coupled to the support bracket about a second axis that is spaced apart from the first axis;
    a cushion frame pivotally coupled to the support bracket about a third axis that is spaced apart from both the first and second axes, such that the seatback frame and the cushion frame move with the support bracket relative to the base portion when the support bracket pivots about the first axis;
    an access actuator mounted on an outer surface of the vehicle seat assembly and configured to enable rotational movement of the support bracket relative to the base portion about the first axis; and
    a cushion latch configured to selectively couple a distal end of the cushion frame to the support bracket such that the cushion latch impedes rotational movement of the cushion frame relative to the support bracket when the cushion latch is in a closed state.

15. The vehicle seat assembly according to claim 14, further comprising
    a release cable coupled to the access actuator and the cushion latch to enable operation of the access actuator to open the cushion latch.

16. The vehicle seat assembly according to claim 14, wherein
    the cushion frame includes a striker configured to engage the cushion latch when the cushion is in a use position.

17. The vehicle seat assembly according to claim 14, wherein
    the cushion latch is biased into a closed position.

18. A vehicle seat assembly comprising
    a base portion;
    a support bracket pivotally coupled to the base portion about a first axis;

a seatback frame pivotally coupled to the support bracket about a second axis that is spaced apart from the first axis;

a cushion frame pivotally coupled to the support bracket about a third axis that is spaced apart from both the first and second axes, such that the seatback frame and the cushion frame move with the support bracket relative to the base portion when the support bracket pivots about the first axis, and the cushion frame is further pivotable relative to the support bracket while the support bracket is stationary relative to the base portion; and an access actuator mounted on an outer surface of the vehicle seat assembly, the access actuator being configured to enable rotational movement of the support bracket relative to the base portion about the first axis and to enable rotational movement of the cushion frame relative to the support bracket about the third axis.

19. A vehicle seat assembly comprising a base portion;

a support bracket pivotally coupled to the base portion about a first axis;

a seatback frame pivotally coupled to the support bracket about a second axis that is spaced apart from the first axis;

a cushion frame pivotally coupled to the support bracket about a third axis that is spaced apart from both the first and second axes, such that the seatback frame and the cushion frame move with the support bracket relative to the base portion when the support bracket pivots about the first axis, and the cushion frame is further pivotable relative to the support bracket while the support bracket is stationary relative to the base portion; and an access actuator mounted on an outer surface of the vehicle seat assembly, the access actuator being configured to enable rotational movement of the support bracket relative to the base portion about the first axis and to enable rotational movement of the seatback frame relative to the support bracket about the second axis.

20. The vehicle seat assembly according to claim 19, wherein the support bracket has a distal end that moves between a position vertically above the first axis to a position vertically below the first axis as the support bracket pivots about the first axis.

\* \* \* \* \*